United States Patent
Bennett et al.

(10) Patent No.: US 8,767,050 B2
(45) Date of Patent: Jul. 1, 2014

(54) DISPLAY SUPPORTING MULTIPLE SIMULTANEOUS 3D VIEWS

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 459 days.

(21) Appl. No.: 12/845,461

(22) Filed: Jul. 28, 2010

(65) Prior Publication Data
US 2011/0157339 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*H04N 7/18* (2006.01)
*H04N 13/04* (2006.01)

(52) U.S. Cl.
CPC .................. *H04N 13/0497* (2013.01)
USPC ........................................................... 348/51

(58) Field of Classification Search
CPC .......... H04N 13/0497; H04N 13/0404; H04N 13/0409; H04N 13/0422; G02B 27/2214
USPC .................................................... 348/36–62
See application file for complete search history.

(56) References Cited

U.S. PATENT DOCUMENTS

| 4,829,365 A | 5/1989 | Eichenlaub |
| 5,315,377 A | 5/1994 | Isono et al. |
| 5,615,046 A | 3/1997 | Gilchrist |
| 5,855,425 A | 1/1999 | Hamagishi |

(Continued)

FOREIGN PATENT DOCUMENTS

| EP | 0833183 A1 | 4/1998 |
| EP | 1662808 A1 | 5/2006 |

(Continued)

OTHER PUBLICATIONS

Shan, et al., Principles and Evaluation of Autostereoscopic Photogrammetric Measurement, Photogrammetric Engineering and Remote Sensing, Journal of the American Society for Photogrammetry and Remote Sensing, vol. 72, No. 4, (2006), 8 pages.

(Continued)

*Primary Examiner* — Andy Rao
(74) *Attorney, Agent, or Firm* — Fiala & Weaver P.L.L.C.

(57) ABSTRACT

A display system and method are provided that enable two-dimensional and/or three-dimensional images to be displayed. One or more light manipulating layers, a pixel array, and an optional backlighting panel are provided. Each light manipulating layer may be a parallax barrier or a lenticular lens. A parallax barrier includes a plurality of barrier elements arranged in a barrier element array. The barrier element array includes a plurality of strips of barrier elements selected to be transparent to form a plurality of non-blocking strips. A lenticular lens includes an array of sub-lenses, and may be elastic. The display system is configured to deliver light from the pixel array or backlighting panel as views to corresponding viewers in a viewing space. The delivered views may include one or more two-dimensional views and/or one or more three-dimensional views.

26 Claims, 25 Drawing Sheets

(56) References Cited

U.S. PATENT DOCUMENTS

| | | |
|---|---|---|
| 5,945,965 A | 8/1999 | Inoguchi et al. |
| 5,969,850 A * | 10/1999 | Harrold et al. ............... 359/320 |
| 5,990,975 A | 11/1999 | Nan et al. |
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,123,213 B2 | 10/2006 | Yamazaki et al. |
| 7,359,105 B2 * | 4/2008 | Jacobs et al. ................ 359/245 |
| 7,440,193 B2 | 10/2008 | Gunasekaran et al. |
| 7,511,774 B2 | 3/2009 | Nam et al. |
| 7,626,644 B2 | 12/2009 | Shestak et al. |
| 7,646,451 B2 | 1/2010 | Vogel et al. |
| 7,885,079 B2 | 2/2011 | Chen et al. |
| 7,954,967 B2 | 6/2011 | Kashiwagi et al. |
| 7,997,783 B2 | 8/2011 | Song et al. |
| 8,154,799 B2 | 4/2012 | Kim et al. |
| 8,174,564 B2 | 5/2012 | Kim et al. |
| 8,209,396 B1 | 6/2012 | Raman et al. |
| 8,284,119 B2 | 10/2012 | Kim et al. |
| 8,310,527 B2 | 11/2012 | Ko et al. |
| 8,368,745 B2 | 2/2013 | Nam et al. |
| 2002/0167862 A1 | 11/2002 | Tomasi et al. |
| 2002/0171666 A1 | 11/2002 | Endo et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0041747 A1 | 3/2004 | Uehara et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2005/0073472 A1 | 4/2005 | Kim et al. |
| 2005/0128353 A1 | 6/2005 | Young et al. |
| 2006/0050785 A1 | 3/2006 | Watanabe et al. |
| 2006/0109242 A1 | 5/2006 | Simpkins |
| 2006/0139448 A1 | 6/2006 | Ha et al. |
| 2006/0139490 A1 | 6/2006 | Fekkes et al. |
| 2006/0244918 A1 * | 11/2006 | Cossairt et al. .................. 353/7 |
| 2006/0256136 A1 | 11/2006 | O'Donnell et al. |
| 2006/0256302 A1 | 11/2006 | Hsu |
| 2006/0271791 A1 | 11/2006 | Novack et al. |
| 2007/0008406 A1 | 1/2007 | Shestak et al. |
| 2007/0008620 A1 * | 1/2007 | Shestak et al. ............... 359/463 |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0139371 A1 | 6/2007 | Harsham et al. |
| 2007/0146267 A1 | 6/2007 | Jang et al. |
| 2007/0153916 A1 | 7/2007 | Demircin et al. |
| 2007/0162392 A1 | 7/2007 | McEnroe et al. |
| 2007/0258140 A1 * | 11/2007 | Shestak et al. ............... 359/465 |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0068329 A1 | 3/2008 | Shestak et al. |
| 2008/0126557 A1 | 5/2008 | Motoyama et al. |
| 2008/0133122 A1 | 6/2008 | Mashitani et al. |
| 2008/0165176 A1 | 7/2008 | Archer et al. |
| 2008/0168129 A1 | 7/2008 | Robbin et al. |
| 2008/0191964 A1 | 8/2008 | Spengler |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0319625 A1 | 12/2009 | Kouhi |
| 2010/0066850 A1 | 3/2010 | Wilson et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090413 A1 | 4/2011 | Liou |
| 2011/0109964 A1 | 5/2011 | Kim et al. |
| 2011/0113343 A1 | 5/2011 | Trauth |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0254698 A1 | 10/2011 | Eberl et al. |
| 2012/0016917 A1 | 1/2012 | Priddle et al. |
| 2012/0081515 A1 | 4/2012 | Jang |
| 2012/0235900 A1 | 9/2012 | Border et al. |
| 2012/0308208 A1 | 12/2012 | Karaoguz et al. |

FOREIGN PATENT DOCUMENTS

| | | |
|---|---|---|
| EP | 1816510 A1 | 8/2007 |
| EP | 1993294 A2 | 11/2008 |
| WO | 2005/045488 A1 | 5/2005 |
| WO | 2007/024118 A1 | 3/2007 |
| WO | 2009/098622 A2 | 8/2009 |

OTHER PUBLICATIONS

Peterka, Dynallax: Dynamic Parallax Barrier Autostereoscopic Display, Ph.D. Dissertation, University of Illinois at Chicago, (2007), 134 pages.

European search Report received for European Patent application No. 10016055.5, mailed on Apr. 12, 2011, 3 pages.

Search Report received for European Patent application No. 10015984.7, mailed on May 3, 2011, 3 pages.

(56) References Cited

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", retrieved from <http://en.wikipedia.org/wiki/Script_(computing)>, on Aug. 16, 2012, 4 pages.

"How browsers work", retrieved from <http://taligarsiel.com/Projects/howbrowserswork1.htm> on Oct. 21, 2010, 54 pages.

Yanagisawa, et al., "A Focus Distance Controlled 3DTV", Proc. SPIE 3012, Stereoscopic Displays and Virtual Reality Systems IV, May 15, 1997, pp. 256-261.

EPO Communication received for European Patent Application No. 10016055.5, mailed on Apr. 5, 2013, 6 pages.

Yanaka, Kazuhisa, "Stereoscopic Display Technique for Web3D Images", SIGGRAPH 2009, New Orleans, Louisiana, Aug. 3-7, 2009, 1 page.

* cited by examiner

1202 — configure the array of barrier elements into a third configuration to deliver a two-dimensional view 1302 — configure the array of barrier elements to deliver a plurality of two-dimensional views

1500

1502
receive light from an array of pixels that includes a plurality of pairs of sets of pixels 1504
select a plurality of strips of barrier elements of a barrier element array to be transparent to form a plurality of parallel transparent slits 1506
filter the light at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images

FIG. 15

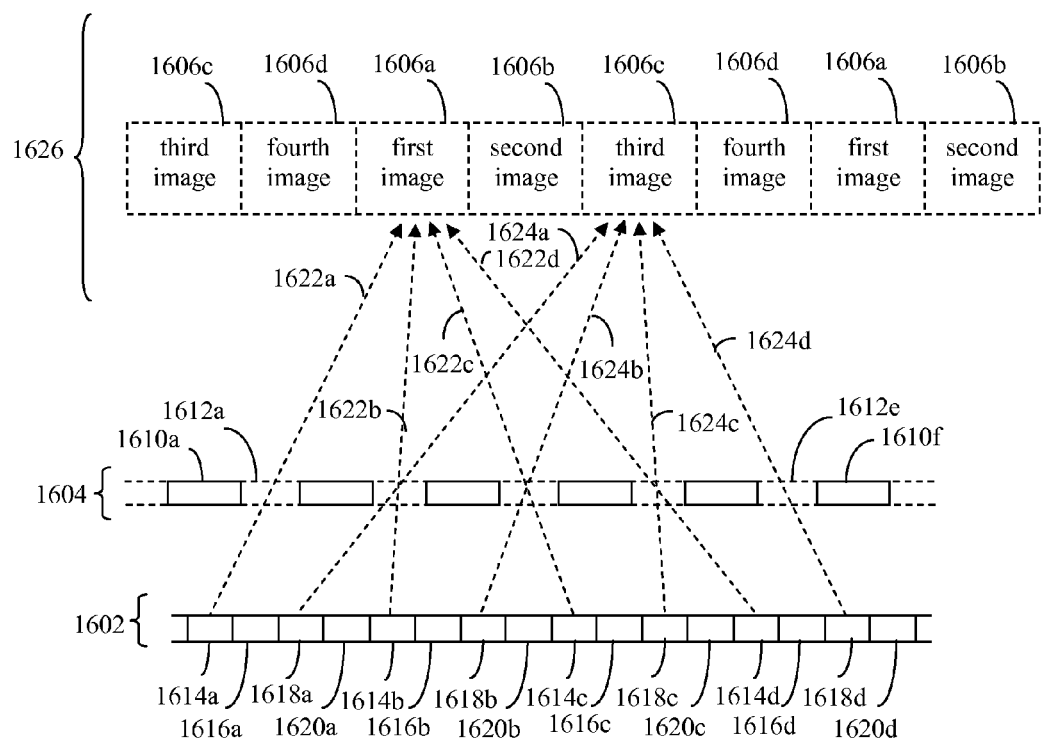

FIG. 16

DISPLAY SUPPORTING MULTIPLE SIMULTANEOUS 3D VIEWS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

BACKGROUND OF THE INVENTION

1. Field of the Invention

The present invention relates to three-dimensional image displays.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device of this type may be switched to a three-dimensional mode for viewing of three-dimensional images, and may be switched to a two-dimensional mode for viewing of two-dimensional images (and/or to provide a respite from the viewing of three-dimensional images).

A parallax barrier is another example of a device that enables images to be displayed in three-dimensions. A parallax barrier includes of a layer of material with a series of precision slits. The parallax barrier is placed proximal to a display so that a user's eyes each see a different set of pixels to create a sense of depth through parallax. A disadvantage of parallax barriers is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional displays that utilize parallax barriers are also constrained in that the displays must be entirely in a two-dimensional image mode or a three-dimensional image mode at any time.

BRIEF SUMMARY OF THE INVENTION

Methods, systems, and apparatuses are described for displays capable of simultaneously delivering one or more two-dimensional views and/or one or more three-dimensional images to multiple viewers in a viewing space substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 15 shows a flowchart for generating multiple three-dimensional images, according to an example embodiment.

FIG. 16 shows a cross-sectional view of an example of the display system of FIG. 2, according to an embodiment.

Figure 1:
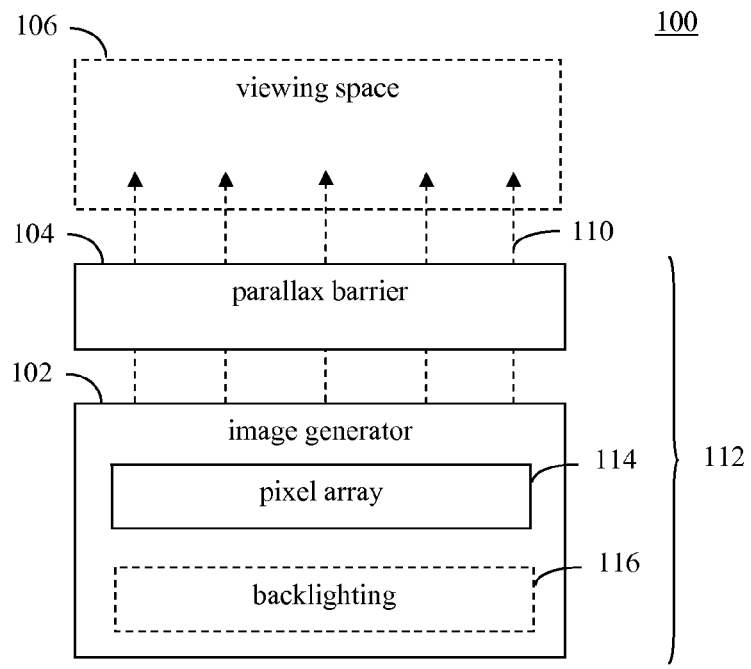
FIG. 1 shows a block diagram of a display system, according to an example embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Embodiments

Embodiments of the present invention relate to display devices that deliver media content to multiple viewers in a viewing space in a manner that enables each viewer to view corresponding media content without interfering with the views of the other viewers. Such display devices include one or more light manipulators, such as parallax barriers and/or lenticular lenses, to deliver the media content in the form of images or views to the eyes of the viewers. In embodiments, the light manipulators may be dynamically modified, thereby changing the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous example embodiments of the present invention. For instance, the next subsection describes embodiments for delivering views using a single light manipulator, followed by a subsection that describes embodiments for delivering views using multiple light manipulators. A subsequent subsection describes example display environments.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example Embodiments for Delivering Views Using a Single Light Manipulator In embodiments, a display device may include an adaptive image filter or light manipulator, such as a parallax barrier or lenticular lens, to enable various display capabilities. For instance, FIG. 1 shows a block diagram of a display system 100, according to an example embodiment. As shown in FIG. 1, system 100 includes a display device 112. Display device 112 is capable of displaying 2D and 3D images. As shown in FIG. 1, display device 112 includes an image generator 102 and a parallax barrier 104. Furthermore, as shown in FIG. 1, image generator 102 includes a pixel array 114 and may optionally include backlighting 116. Image generator 102 and parallax barrier 104 operate to generate 2D and/or 3D images that are viewable by users/viewers in a viewing space 106. Although parallax barrier 104 is shown positioned between image generator 102 and viewing space 106 in FIG. 1, as further described below, parallax barrier 104 may alternatively be positioned between portions of image generator 102 (e.g., between pixel array 114 and backlighting 116). Furthermore, for illustrative purposes, display device 112 is described with respect to parallax barrier 104 being present as a light manipulator, although it is noted that in an alternative embodiment, a lenticular lens may be used in place of parallax barrier 104.

When present, backlighting 116 emits light that is filtered by parallax barrier 104, and the filtered light is received by pixel array 114, which imposes image information on the filtered light by performing further filtering. When backlighting 116 is not present, pixel array 114 may be configured to emit light which includes the image information, and the emitted light is filtered by parallax barrier 104. Parallax barrier 104 operates as an image filter or "light manipulator" to filter received light with a plurality of barrier elements (also referred to as "blocking regions") that are selectively substantially opaque or transparent to enable three-dimensional images to be generated from the image information provided by pixel array 114. The image information may include one or more still images, motion (e.g., video) images, etc. As shown in FIG. 1, image generator 102 and parallax barrier 104 generate filtered light 110. Filtered light 110 may include one or more two-dimensional images and/or three-dimensional images (e.g., formed by a pair of two-dimensional images in filtered light 110), for instance. Filtered light 110 is received in viewing space 106 proximate to display device 112. One or more users may be present in viewing space 106 to view the images included in filtered light 110. Display device 112 has a single viewing plane or surface (e.g., a plane or surface of pixel array 114, a plane or surface of parallax barrier 104) that supports one or more viewers with media content in the form of the images or views. Multiple views or images may be supported by the single viewing plane of display device 112 that are each based on corresponding media content.

Display device 112 may be implemented in various ways. For instance, display device 112 may be a television display (e.g., an LCD (liquid crystal display) television, a plasma television, etc.), a computer monitor, or any other type of display device. Image generator 102 may be any suitable type or combination of light and image generating devices, including an LCD screen, a plasma screen, an LED (light emitting device) screen (e.g., an OLED (organic LED) screen), etc. Parallax barrier 104 may be any suitable light filtering device, including an LCD filter, a mechanical filter (e.g., that incorporates individually controllable shutters), etc., and may be configured in any manner, including as a thin-film device (e.g., formed of a stack of thin film layers), etc. Backlighting 116 may be any suitable light emitting device, including a panel of LEDs or other light emitting elements.

Figure 2A:
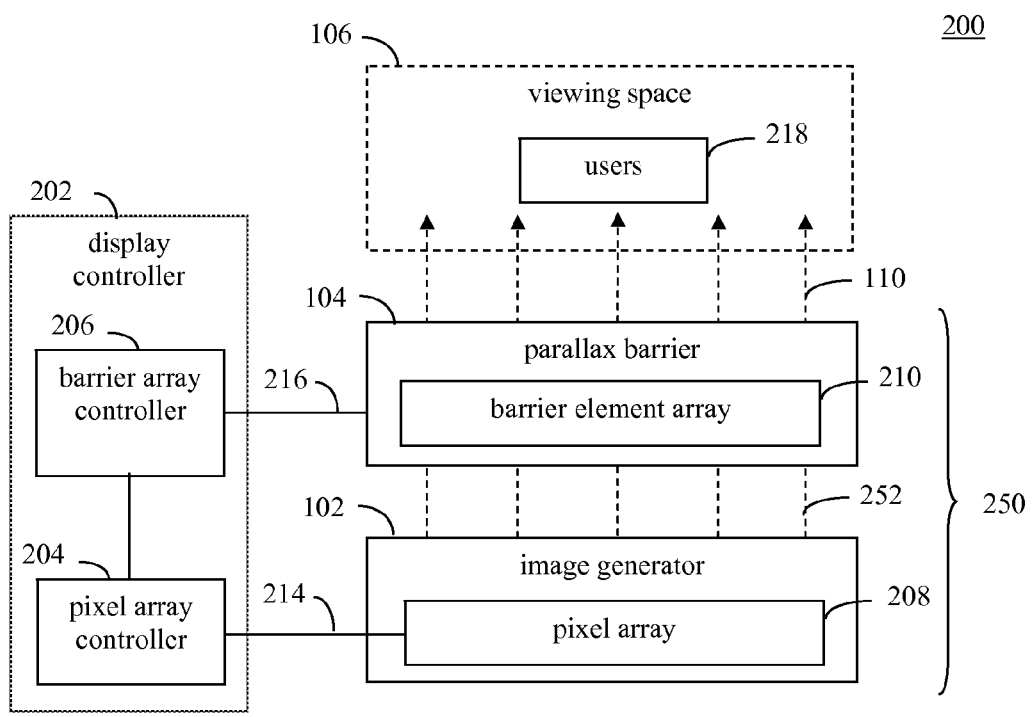
FIGS. 2A and 2B show block diagrams of examples of the display system of FIG. 1, according to embodiments.

FIG. 2A shows a block diagram of a display system 200, which is an example of system 100 shown in FIG. 1, according to an embodiment. As shown in FIG. 2A, system 200 includes a display device controller 202 and a display device 250 (which includes image generator 102 and parallax barrier 104). Display device 250 is an example of display device 112 in FIG. 1. As shown in FIG. 2A, image generator 102 includes a pixel array 208 (which is an example of pixel array 114 of FIG. 1), and parallax barrier 104 includes a barrier element array 210. Furthermore, as shown in FIG. 2A, display controller 202 includes a pixel array controller 204 and a barrier array controller 206. These features of system 200 are described as follows.

Pixel array 208 includes a two-dimensional array of pixels (e.g., arranged in a grid or other distribution). Pixel array 208 is a self-illuminating or light-generating pixel array such that the pixels of pixel array 208 each emit light included in light 252 emitted from image generator 102. Each pixel may be a separately addressable light source (e.g., a pixel of a plasma display, an LCD display, an LED display such as an OLED display, or of other type of display). Each pixel of pixel array 208 may be individually controllable to vary color and intensity. In an embodiment, each pixel of pixel array 208 may include a plurality of sub-pixels that correspond to separate color channels, such as a trio of red, green, and blue sub-pixels included in each pixel.

Figure 3:
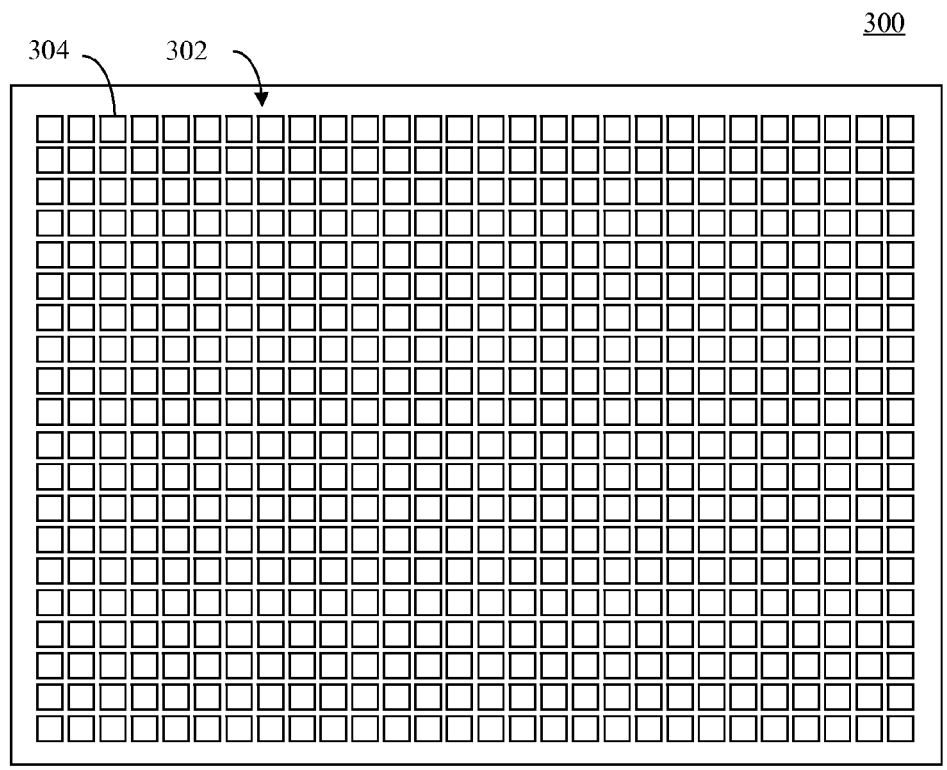
FIG. 3 shows a view of a surface of a parallax barrier, according to an example embodiment.

Parallax barrier 104 is positioned proximate to a surface of pixel array 208. Barrier element array 210 is a layer of parallax barrier 104 that includes a plurality of barrier elements or blocking regions arranged in an array. Each barrier element of the array is configured to be selectively opaque or transparent. For instance, FIG. 3 shows a parallax barrier 300, according to an example embodiment. Parallax barrier 300 is an example of parallax barrier 104 of FIG. 2A. As shown in FIG. 3, parallax barrier 300 includes a barrier element array 302. Barrier element array 302 includes a plurality of barrier elements 304 arranged in a two-dimensional array (e.g., arranged in a grid), although in other embodiments, may include barrier elements 304 arranged in other ways. Barrier elements 304 may each be a pixel of an LCD, a moveable mechanical element (e.g., a hinged flap that passes light in a first position and blocks light in a second position), a magnetically actuated element, or other suitable barrier element. Each barrier element 304 is shown in FIG. 3 as rectangular (e.g., square) in shape, but in other embodiments may have other shapes.

For example, in one embodiment, each barrier element 304 may have a "band" shape that extends a vertical length of barrier element array 302, such that barrier element array 302 includes a single horizontal row of barrier elements 304. Each barrier element 304 may include one or more of such bands, and different portions of barrier element array 302 may include barrier elements 304 that include different numbers of such bands. One advantage of such a configuration is that barrier elements 304 extending a vertical length of barrier element array 302 do not need to have spacing between them because there is no need for drive signal routing in such space. For instance, in a two-dimensional LCD array configuration, such as TFT (thin film transistor) display, a transistor-plus-capacitor circuit is typically placed onsite at the corner of a single pixel in the array, and control signals for such transistors are routed between the LCD pixels (row-column control, for example). In a pixel configuration for a parallax barrier, local transistor control may not be necessary because barrier elements 304 may not need to be changing as rapidly as display pixels (e.g., pixels of pixel array 208). For a single row of vertical bands of barrier elements 304, control signals may be routed to the top and/or bottom of barrier elements 304. Because in such a configuration control signal routing between rows is not needed, the vertical bands can be arranged side-by-side with little-to-no space in between. Thus, if the vertical bands are thin and oriented edge-to-edge, one band or multiple adjacent bands (e.g., five bands) may comprise a barrier element 304 in a blocking state, followed by one band or multiple adjacent bands (e.g., two bands) that comprise a barrier element 304 in a non-blocking state (a slit), and so on. In the example of five bands in a blocking state and two bands in a non-blocking state, the five bands may combine to offer a single black barrier element of approximately 2.5 times the width of a single transparent slit with no spaces therein.

Barrier element array 302 may include any number of barrier elements 304. For example, in FIG. 3, barrier element array 302 includes twenty-eight barrier elements 304 along an x-axis and includes twenty barrier elements 304 along a y-axis, for a total number of five hundred and sixty barrier elements 304. However, these dimensions of barrier element array 302 and the total number of barrier elements 304 for barrier element array 302 shown in FIG. 3 are provided for illustrative purposes, and are not intended to be limiting. Barrier element array 302 may include any number of barrier elements 304, and may have any array dimensions, including ones, tens, hundreds, thousands, or even larger numbers of barrier elements 304 along each of the x- and y-axes. Barrier element array 302 of FIG. 3 is merely illustrative of larger barrier arrays that may be typically present in embodiments of parallax barrier 104. In embodiments, the width of one barrier element in a barrier element array may be a multiple or divisor of a corresponding display pixel width (e.g., a width of a pixel of pixel array 114). Similarly, a number of columns/rows in a barrier element array may be a multiple or divisor of a corresponding number of columns/rows of pixels in a corresponding pixel array.

Figure 4:
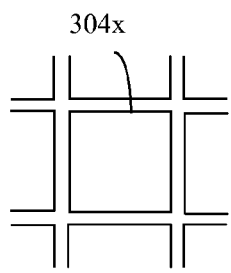
FIGS. 4 and 5 show views of a barrier element of a barrier element array that is selected to be transparent and to be opaque, respectively, according to example embodiments.
Figure 5:
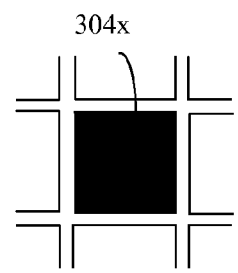

Each barrier element 304 of barrier element array 302 is selectable to be substantially opaque or transparent. For instance, FIG. 4 shows a barrier element 304x that is selected to be substantially transparent, and FIG. 5 shows barrier element 304x when selected to be substantially opaque, according to example embodiments. When barrier element 304x is selected to be transparent, light 252 from pixel array 208 may pass through barrier element 304x (e.g., to viewing space 106). When barrier element 304x is selected to be opaque, light 252 from pixel array 208 is blocked from passing through barrier element 304x. By selecting some of barrier elements 304 of barrier element array 302 to be transparent, and some of barrier elements 304 of barrier element array 302 to be opaque, light 252 received at barrier element array 302 is filtered to generate filtered light 110. It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Display controller 202 is configured to generate control signals to enable display device 250 to display two-dimensional and three-dimensional images to users 218 in viewing space 106. For example, pixel array controller 204 is configured to generate a control signal 214 that is received by pixel array 208. Control signal 214 may include one or more control signals used to cause pixels of pixel array 208 to emit light 252 of particular desired colors and/or intensity. Barrier array controller 206 is configured to generate a control signal 216 that is received by barrier element array 210. Control signal 216 may include one or more control signals used to cause each of barrier elements 304 of barrier element array 302 to be transparent or opaque. In this manner, barrier element array 210 filters light 252 to generate filtered light 110 that includes one or more two-dimensional and/or three-dimensional images that may be viewed by users 218 in viewing space 106.

For example, control signal 214 may control sets of pixels of pixel array 208 to each emit light representative of a respective image, to provide a plurality of images. Control signal 216 may control barrier elements 304 of barrier element array 210 to filter the light received from pixel array 208 according to the provided images such that one or more of the images are received by users 218 in two-dimensional form. For instance, control signal 216 may select one or more sets of barrier elements 304 of barrier element array 302 to be transparent, to transmit one or more corresponding two-dimensional images or views to users 218. Furthermore, control signal 216 may control sections of barrier element array 210 to include opaque and transparent barrier elements 304 to filter the light received from pixel array 208 so that one or more pairs of images or views provided by pixel array 208 are each received by users 218 as a corresponding three-dimensional image or view. For example, control signal 216 may select parallel strips of barrier elements 304 of barrier element array 302 to be transparent to form slits that enable three-dimensional images to be received by users 218.

In embodiments, control signal 216 may be generated by barrier array controller 206 to configure one or more characteristics of barrier element array 210. For example, control signal 216 may be generated to form any number of parallel strips of barrier elements 304 of barrier element array 302 to be transparent, to modify the number and/or spacing of parallel strips of barrier elements 304 of barrier element array 302 that are transparent, to select and/or modify a width and/or a length (in barrier elements 304) of one or more strips of barrier elements 304 of barrier element array 302 that are transparent or opaque, to select and/or modify an orientation of one or more strips of barrier elements 304 of barrier element array 302 that are transparent, to select one or more areas of barrier element array 302 to include all transparent or all opaque barrier elements 304, etc.

Figure 2B:
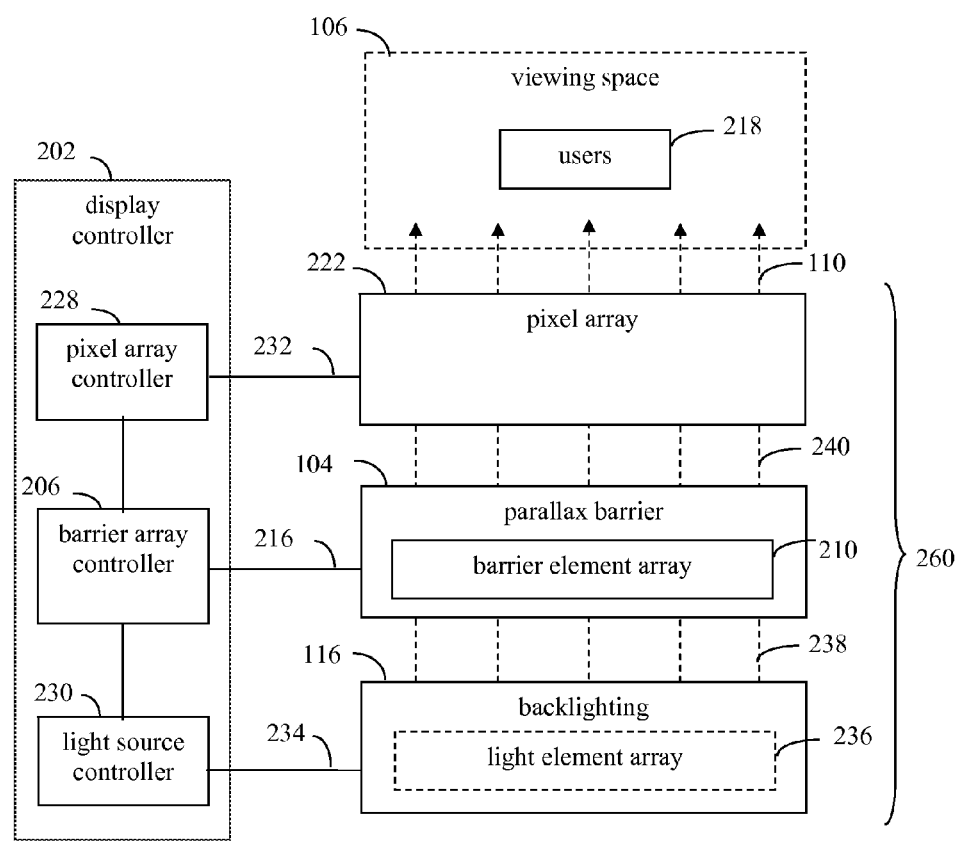

FIG. 2B shows a block diagram of a display system 220, which is another example of system 100 shown in FIG. 1, according to an embodiment. As shown in FIG. 2B, system 220 includes display device controller 202 and a display device 260, which includes a pixel array 222, parallax barrier 104, and backlighting 116. Display device 260 is an example of display device 112 in FIG. 1. As shown in FIG. 2B, parallax barrier 104 includes barrier element array 210 and backlighting 116 includes a light element array 236. Furthermore, display controller 202 includes a pixel array controller 228, barrier array controller 206, and a light source controller 230. Although separated by parallax barrier 104 in FIG. 2B, pixel array 222 and backlighting 116 form an example of image generator 102 of FIG. 1. These features of system 220 are described as follows.

Backlighting 116 is a backlight panel that emits light 238. Light element array 236 (or "backlight array") of backlighting 116 includes a two-dimensional array of light sources. Such light sources may be arranged, for example, in a rectangular grid. Each light source in light element array 236 is individually addressable and controllable to select an amount of light emitted thereby. A single light source may comprise one or more light-emitting elements depending upon the implementation. In one embodiment, each light source in light element array 236 comprises a single light-emitting diode (LED) although this example is not intended to be limiting.

Parallax barrier 104 is positioned proximate to a surface of backlighting 116 (e.g., a surface of the backlight panel). As described above, barrier element array 210 is a layer of parallax barrier 104 that includes a plurality of barrier elements or blocking regions arranged in an array. Each barrier element of the array is configured to be selectively opaque or transparent. FIG. 3, as described above, shows a parallax barrier 300, which is an example of parallax barrier 104 of FIG. 2B. Barrier element array 210 filters light 238 received from backlighting 116 to generate filtered light 240. Filtered light 240 is configured to enable a two-dimensional image or a three-dimensional image (e.g., formed by a pair of two-dimensional images in filtered light 110) to be formed based on images subsequently imposed on filtered light 240 by pixel array 222.

Similarly to pixel array 208 of FIG. 2A, pixel array 222 of FIG. 2B includes a two-dimensional array of pixels (e.g., arranged in a grid or other distribution). However, pixel array 222 is not self-illuminating, and instead is a light filter that imposes images (e.g., in the form of color, grayscale, etc.) on filtered light 240 from parallax barrier 104 to generate filtered light 110 to include one or more images. Each pixel of pixel array 222 may be a separately addressable filter (e.g., a pixel of a plasma display, an LCD display, an LED display, or of other type of display). Each pixel of pixel array 208 may be individually controllable to vary the color imposed on the corresponding light passing through, and/or to vary the intensity of the passed light in filtered light 110. In an embodiment, each pixel of pixel array 222 may include a plurality of sub-pixels that correspond to separate color channels, such as a trio of red, green, and blue sub-pixels included in each pixel.

Display controller 202 of FIG. 2B is configured to generate control signals to enable display device 260 to display two-dimensional and three-dimensional images to users 218 in viewing space 106. For example, light source controller 230 within display controller 202 controls the amount of light emitted by each light source in light element array 236 by generating a control signal 234 that is received by light element array 236. Control signal 234 may include one or more control signals used to control the amount of light emitted by each light source in light element array 236 to generate light 238. As described above, barrier array controller 206 is configured to generate control signal 216 received by barrier element array 210. Control signal 216 may include one or more control signals used to cause each of barrier elements 304 of barrier element array 302 to be transparent or opaque, to filter light 238 to generate filtered light 240. Pixel array controller 228 is configured to generate a control signal 232 that is received by pixel array 222. Control signal 232 may include one or more control signals used to cause pixels of pixel array 222 to impose desired images (e.g., colors, grayscale, etc.) on filtered light 240 as it passes through pixel array 222. In this manner, pixel array 222 generates filtered light 110 that includes one or more two-dimensional and/or three-dimensional images that may be viewed by users 218 in viewing space 106.

For example, control signal 234 may control sets of light sources of light element array 236 to emit light 238. Control signal 216 may control barrier elements 304 of barrier element array 210 to filter light 238 received from light element array 236 to enable filtered light 240 to enable two- and/or three-dimensionality. Control signal 232 may control sets of pixels of pixel array 222 to filter filtered light 240 according to respective images, to provide a plurality of images. For instance, control signal 216 may select one or more sets of the barrier elements 304 of barrier element array 302 to be transparent, to enable one or more corresponding two-dimensional images to be delivered to users 218. Furthermore, control signal 216 may control sections of barrier element array 210 to include opaque and transparent barrier elements 304 to filter the light received from light element array 236 so that one or more pairs of images provided by pixel array 222 are each enabled to be received by users 218 as a corresponding three-dimensional image. For example, control signal 216 may select parallel strips of barrier elements 304 of barrier element array 302 to be transparent to form slits that enable three-dimensional images to be received by users 218.

Figure 6:
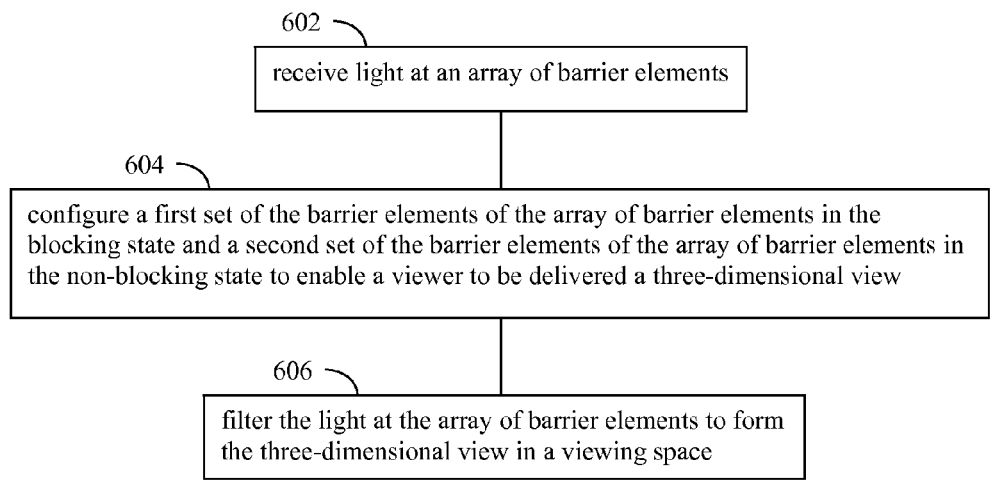
FIG. 6 shows a flowchart for generating three-dimensional images, according to an example embodiment.
Figure 7:
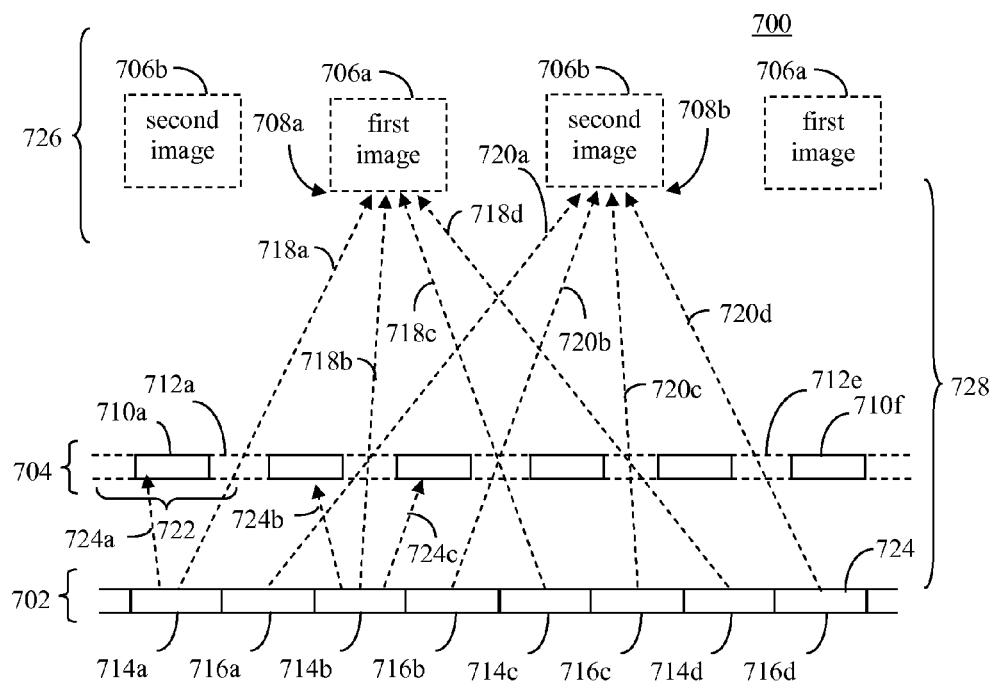
FIG. 7 shows a cross-sectional view of an example of a display system, according to an embodiment.

Two-dimensional and three-dimensional images may be generated by system 100 of FIG. 1 in various ways, in embodiments. For instance, FIG. 6 shows a flowchart 600 for generating images that are delivered to users in a viewing space, according to an example embodiment. Flowchart 600 may be performed by system 200 in FIG. 2A or system 220 of FIG. 2B, for example. Flowchart 600 is described with respect to FIG. 7, which shows a cross-sectional view of a display system 700. Display system 700 is an example embodiment of system 200 shown in FIG. 2A, and is shown for purposes of illustration. As shown in FIG. 7, system 700 includes a pixel array 702 and a barrier element array 704. In another embodiment, system 700 may further include backlighting in a configuration similar to display system 220 of FIG. 2B. Further structural and operational embodiments will be apparent to persons skilled in the relevant art(s) based on the discussion regarding flowchart 600. Flowchart 600 is described as follows.

Flowchart 600 begins with step 602. In step 602, light is received at an array of barrier elements. For example, as shown in FIG. 2A, light 252 is received at parallax barrier 104 from pixel array 208 of image generator 102. Each pixel of pixel array 208 may generate light that is received at parallax barrier 104. Depending on the particular display mode of parallax barrier 104, parallax barrier 104 may filter light 252 from pixel array 208 to generate a two-dimensional image or a three-dimensional image viewable in viewing space 106 by users 218. As described above with respect to FIG. 2B, alternatively, light 238 may be received by parallax barrier 104 from light element array 236.

In step 604, a first set of the barrier elements of the array of barrier elements is configured in the blocking state and a second set of the barrier elements of the array of barrier elements is configured in the non-blocking state to enable a viewer to be delivered a three-dimensional view. Three-dimensional image content may be provided for viewing in viewing space 106. In such case, referring to FIG. 2A or 2B, barrier array controller 206 may generate control signal 216 to configure barrier element array 210 to include transparent strips of barrier elements to enable a three-dimensional view to be formed. For example, as shown in FIG. 7, barrier element array 704 includes a plurality of barrier elements that are each either transparent (in a non-blocking state) or opaque (in a blocking state). Barrier elements that are blocking are indicated as barrier elements 710a-710f, and barrier elements that are non-blocking are indicated as barrier elements 712a-712e. Further barrier elements may be included in barrier element array 704 that are not visible in FIG. 7. Each of barrier elements 710a-710f and 712a-712e may include one or more barrier elements. Barrier elements 710 alternate with barrier elements 712 in series in the order of barrier elements 710a, 712a, 710b, 712b, 710c, 712c, 710d, 712d, 710e, 712e, and 710f. In this manner, blocking barrier elements 710 are alternated with non-blocking barrier elements 712 to form a plurality of parallel non-blocking or transparent slits in barrier element array 704.

Figure 8A:
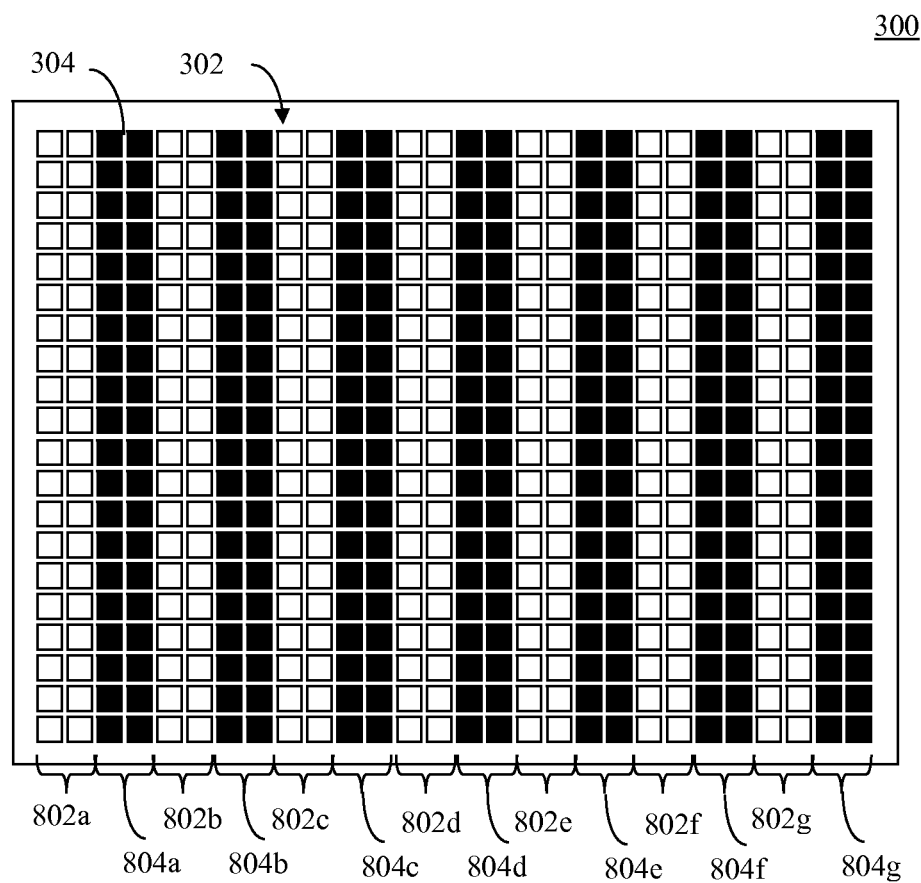
FIGS. 8A and 8B shows view of example parallax barriers with non-blocking slits, according to embodiments.

For instance, FIG. 8A shows a view of parallax barrier 300 of FIG. 3 with transparent slits, according to an example embodiment. As shown in FIG. 8A, parallax barrier 300 includes barrier element array 302, which includes a plurality of barrier elements 304 arranged in a two-dimensional array. Furthermore, as shown in FIG. 8A, barrier element array 302 includes a plurality of parallel strips of barrier elements 304 that are selected to be non-blocking to form a plurality of parallel non-blocking strips (or "slits") 802a-802g. As shown in FIG. 8A, parallel non-blocking strips 802a-802g (non-blocking slits) are alternated with parallel blocking or blocking strips 804a-804g of barrier elements 304 that are selected to be blocking. In the example of FIG. 8A, non-blocking strips 802a-802g and blocking strips 804a-804g each have a width (along the x-dimension) of two barrier elements 304, and have lengths that extend along the entire y-dimension (twenty barrier elements 304) of barrier element array 304, although in other embodiments, may have alternative dimensions. Non-blocking strips 802a-802g and blocking strips 804a-804g form a parallax barrier configuration for parallax barrier 300. The spacing (and number) of parallel non-blocking strips 802 in barrier element array 704 may be selectable by choosing any number and combination of particular strips of barrier elements 304 in barrier element array 302 to be non-blocking, to be alternated with blocking strips 804, as desired. For example, hundreds, thousands, or even larger numbers of non-blocking strips 802 and blocking strips 804 may be present in parallax barrier 300.

Figure 8B:
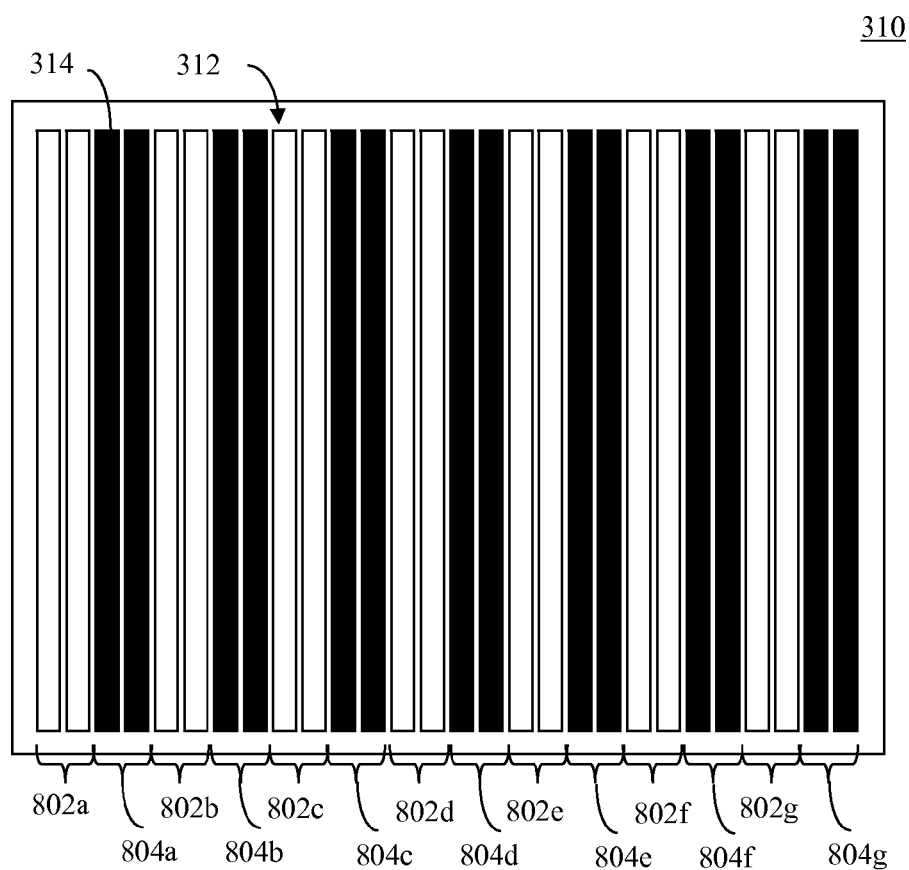

FIG. 8B shows a parallax barrier 310 that is another example of barrier element array 704 with parallel transparent slits, according to an embodiment. Similarly to parallax barrier 300 of FIG. 8A, parallax barrier 310 has includes a barrier element array 312, which includes a plurality of barrier elements 314 arranged in a two-dimensional array (28 by 1 array). Barrier elements 314 have widths (along the x-dimension) similar to the widths of barrier elements 304 in FIG. 8A, but have lengths that extend along the entire vertical length (y-dimension) of barrier element array 314. As shown in FIG. 8B, barrier element array 312 includes parallel non-blocking strips 802a-802g alternated with parallel blocking strips 804a-804g. In the example of FIG. 8B, parallel non-blocking strips 802a-802g and parallel blocking strips 804a-804g each have a width (along the x-dimension) of two barrier elements 314, and have lengths that extend along the entire y-dimension (one barrier element 314) of barrier element array 312.

Referring back to FIG. 6, in step 606, the light is filtered at the array of barrier elements to form the three-dimensional view in a viewing space. Barrier element array 210 of parallax barrier 210 is configured to filter light 252 received from pixel array 208 (FIG. 2A) or light 238 received from light element array 236 (FIG. 2B) according to whether barrier element array 210 is transparent or non-blocking (e.g., in a two-dimensional mode) or includes parallel non-blocking strips (e.g., in a three-dimensional mode). If one or more portions of barrier element array 210 are transparent (e.g., barrier element array 302 is shown entirely transparent in FIG. 3), those portions of barrier element array 210 function as "all pass" filters to substantially pass all of light 252 as filtered light 110 to deliver one or more corresponding two-dimensional images generated by pixel array 208 to viewing space 106, to be viewable as a two-dimensional images in a similar fashion as a conventional display. If barrier element array 210 includes one or more portions having parallel non-blocking strips (e.g., as shown for barrier element array 302 in FIGS. 8A and 8B), those portions of barrier element array 210 pass a portion of light 252 as filtered light 110 to deliver one or more corresponding three-dimensional images to viewing space 106.

For example, as shown in FIG. 7, pixel array 702 includes a plurality of pixels 714a-714d and 716a-716d. Pixels 714 alternate with pixels 716, such that pixels 714a-714d and 716a-716d are arranged in series in the order of pixels 714a, 716a, 714b, 716b, 714c, 716c, 714d, and 716d. Further pixels may be included in pixel array 702 that are not visible in FIG. 7, including further pixels along the width dimension of pixel array 702 (e.g., in the left-right directions) as well as pixels along a length dimension of pixel array 702 (not visible in FIG. 7). Each of pixels 714a-714d and 716a-716d generates light, which emanates from display surface 724 of pixel array 702 (e.g., generally upward in FIG. 7) towards barrier element array 704. Some example indications of light emanating from pixels 714a-714d and 716a-716d are shown in FIG. 7 (as dotted lines), including light 724a and light 718a emanating from pixel 714a, light 724b, light 718b, and light 724c emanating from pixel 714b, etc.

Furthermore, light emanating from pixel array 702 is filtered by barrier element array 704 to form a plurality of images in a viewing space 726, including a first image 706a at a first location 708a and a second image 706b at a second location 708b. A portion of the light emanating from pixel array 702 is blocked by blocking barrier elements 710, while another portion of the light emanating from pixel array 702 passes through non-blocking barrier elements 712, according to the filtering by barrier element array 704. For instance, light 724a from pixel 714a is blocked by blocking barrier element 710a, and light 724b and light 724c from pixel 714b are blocked by blocking barrier elements 710b and 710c, respectively. In contrast, light 718a from pixel 714a is passed by non-blocking barrier element 712a and light 718b from pixel 714b is passed by non-blocking barrier element 712b.

By forming parallel non-blocking slits in a barrier element array, light from a pixel array can be filtered to form multiple images or views in a viewing space. For instance, system 700 shown in FIG. 7 is configured to form first and second images 706a and 706b at locations 708a and 708b, respectively, which are positioned at a distance 728 from pixel array 702 (as shown in FIG. 7, further instances of first and second images 706a and 706b may be formed in viewing space 726 according to system 700, in a repeating, alternating fashion). As described above, pixel array 702 includes a first set of pixels 714a-714d and a second set of pixels 716a-716d. Pixels 714a-714d correspond to first image 706a and pixels 716a-716d correspond to second image 706b. Due to the spacing of pixels 714a-714d and 716a-716d in pixel array 702, and the geometry of non-blocking barrier elements 712 in barrier element array 704, first and second images 706a and 706b are formed at locations 708a and 708b, respectively. As shown in FIG. 7, light 718a-718d from the first set of pixels 714a-714d is focused at location 708a to form first image 706a at location 708a. Light 720a-720d from the second set of pixels 716a-716d is focused at location 708b to form second image 706b at location 708b.

Figure 9:
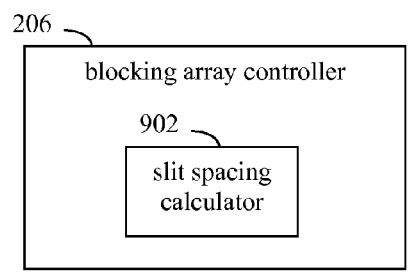
FIG. 9 shows a block diagram of a barrier array controller, according to an example embodiment.

FIG. 7 shows a slit spacing 722 (center-to-center) of non-blocking barrier elements 712 in barrier element array 704. Spacing 722 may be determined to select locations for parallel non-blocking slits to be formed in barrier element array 704 for a particular image distance 728 at which images are desired to be formed (for viewing by users). For example, in an embodiment, if a spacing of pixels 714a-714d corresponding to an image is known, and a distance 728 at which the image is desired to be displayed is known, the spacing 722 between adjacent parallel non-blocking slits in barrier element array 704 may be selected. As shown in FIG. 9, in an embodiment, barrier array controller 206 (of FIG. 2A or 2B) may include a slit spacing calculator 902. Slit spacing calculator 902 is configured to calculate spacing 722 for a particular spacing of pixels and a desired distance for the corresponding image to be formed, according to corresponding parallax barrier configurations.

Figure 10:
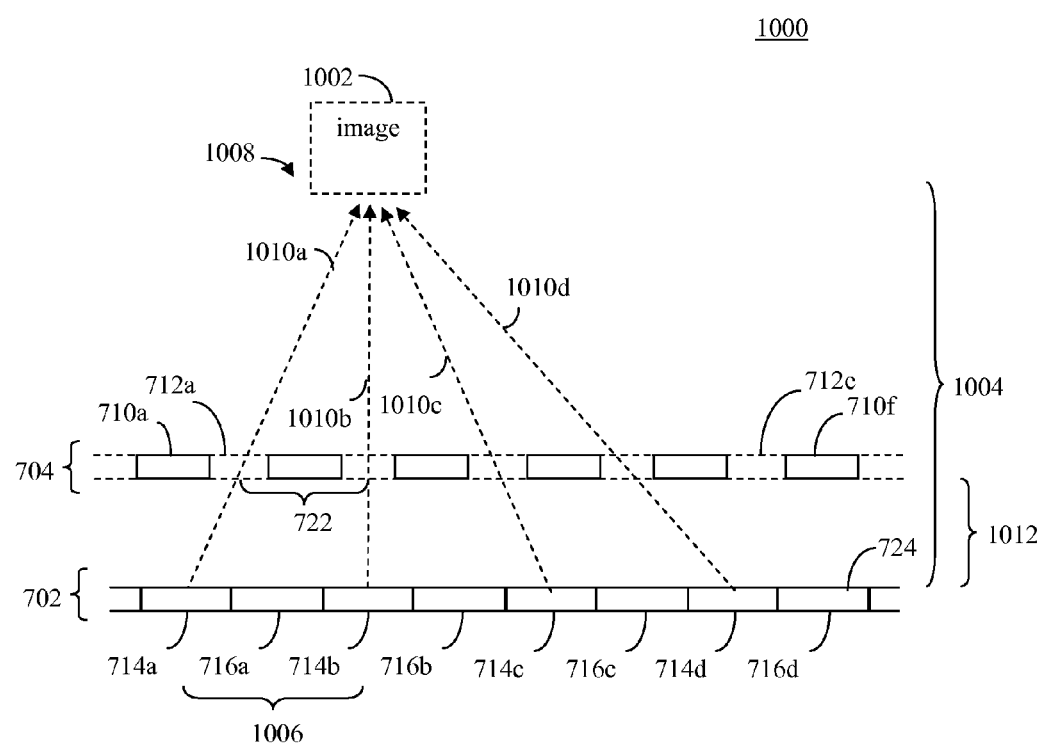
FIG. 10 shows an example display system configured to generate three-dimensional images, according to an example embodiment.

For instance, FIG. 10 shows an example display system 1000, according to an example embodiment. Display system 1000 is generally similar to system 700 shown in FIG. 7, and includes pixel array 702 and barrier element array 704. Pixel array 702 includes pixels 714a-714d and 716a-716d, and barrier element array 704 includes blocking barrier elements 710a-710f and non-blocking barrier elements 712a-712e. An image 1002 is desired to be formed at an image distance 1004 from pixel array 702 based on pixels 714a-714d. Barrier element array 704 is separated from pixel array 702 by a distance 1012. Adjacent pixels of pixels 714a-714d (corresponding to the desired image) are separated by a pixel separation distance 1006. Spacing 722 for adjacent non-blocking barrier elements 712a-712e (corresponding to non-blocking slits) is desired to be selected to enable image 1002 to be formed at distance 1004 from pixel array 702. For the configuration of display system 1000 in FIG. 10, the following equation (Equation 1) holds:

distance 1006/distance 1004=spacing 722/(distance 1004−distance 1012)  Equation 1

As such, spacing 722 may be calculated (e.g., by slit spacing calculator 902) according to Equation 2 shown below, where slit spacing 722 is less than pixel separation distance 1006:

spacing 722=distance 1006×(distance 1004−distance 1012)/distance 1004  Equation 2

For instance, in one example embodiment, distance 1006 may equal 1.0 mm, distance 1004 may equal 2.0 meters, and distance 1012 may equal 5.0 mm. In such an example, spacing 722 may be calculated according to Equation 2 as follows:

spacing 722=1.0×(2000−5)/2000=0.9975 mm

In the above example, the centers of adjacent non-blocking barrier elements 712a-712e may be separated by spacing 722 of 0.9975 mm to form image 1002 at 2.0 meters from pixel array 702. As shown in FIG. 10, light 1010a-1010d emanated by pixels 714a-714d, as filtered by barrier element array 704, forms image 1002 at location 1008. Separating the centers of adjacent non-blocking barrier elements 712a-712e by 0.9975 mm (or other determined distance) may be accomplished in various ways, depending on the particular configuration of barrier element array 704. For instance, in this example, a single barrier element width non-blocking slit may be formed in barrier element array 704 every 0.9975 mm. Alternatively, a non-blocking slit may be formed in barrier element array 704 every 0.9975 mm having a width of more than one barrier element.

For example, if spacing 722 corresponds to the width of two barrier elements, single non-blocking barrier elements 712 having a width of 0.9975/2=0.4988 mm may be alternated with single blocking barrier elements 710 having the width of 0.4988 mm in barrier element array 704. Alternatively, if spacing 722 corresponds to the width of more than two barrier elements, one or more non-blocking barrier elements may be alternated with one or more blocking barrier elements to for non-blocking slits every 0.9975 mm. In one example, single non-blocking barrier elements 712 having a width of 0.9975/399=0.0025 mm may be alternated with three hundred and ninety-eight blocking barrier elements 710 each having the width of 0.0025 mm in barrier element array 704. In another example, ten non-blocking barrier elements 712 each having a width of 0.0025 mm may be alternated with three hundred and eighty-nine blocking barrier elements 710 each having the width of 0.0025 mm in barrier element array 704.

Thus, referring to FIG. 7, first and second images 706a and 706b may be formed by display system 700 at a distance 728 from pixel array 702 by calculating a value for slit spacing 722 as described above. Equation 2 is provided as one example technique for selecting non-blocking slit spacing, for purposes of illustration. Alternatively, other techniques may be used to calculate and/or determine values for slit spacing 722. For instance, in an embodiment, a lookup table that includes pre-calculated values for slit spacing 722 may be maintained by barrier array controller 206. The lookup table may be used to look up values for slit spacing 722 for corresponding values of image distance 1004 and pixel spacing 1006. Furthermore, slit spacing 722 and or other parameters of display system 700 (e.g., as indicated in FIG. 10 for display system 1000) may be modified/selected to modify image placement, as would be known to persons skilled in the relevant art(s). For instance, Shan et al, "Principles and Evaluation of Autostereoscopic Photogrammetric Measurement," Photogrammetric Engineering & Remote Sensing Vol. 72, No. 4, April 2006, pp. 365-372, which is incorporated herein by reference in its entirety, describes example techniques for determining image viewing locations/geometries based upon various selected parameters of a display device.

It is noted that in the examples of FIGS. 7 and 10, pixel array 702 and barrier element array 704 are each shown as being substantially planar. In other embodiments, pixel array 702 and/or barrier element array 704 may be curved (e.g., concave or convex relative to viewing space 726). As such, equations, lookup tables, etc., used to calculate values for slit spacing 722 and/or other parameters of a display system may be configured to account for such curvature, in a manner as would be known to persons skilled in the relevant art(s).

Figures 11, 12:
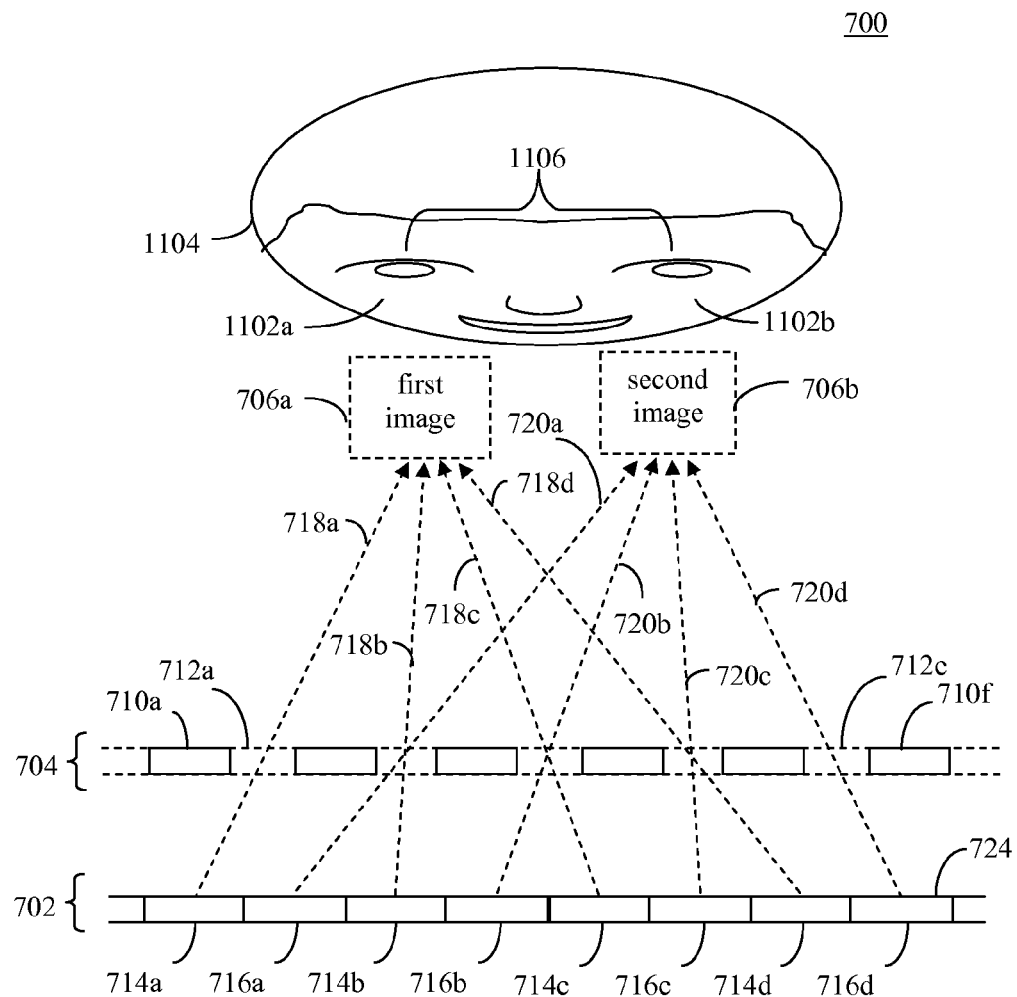
FIG. 11 shows the display system of FIG. 7 providing a three-dimensional image to a user, according to an example embodiment.
FIG. 12 shows a process for forming a two-dimensional image, according to an example embodiment.

First and second images 706a and 706b are configured to be perceived by a user as a three-dimensional image or view. For example, FIG. 11 shows display system 700 of FIG. 7, where a viewer 1104 receives first image 706a at a first eye location 1102a and second image 706b at a second eye location 1102b, according to an example embodiment. First and second images 706a and 706b may be generated by first set of pixels 714a-714d and second set of pixels 716a-716d as images that are slightly different perspective from each other. Images 706a and 706b are combined in the visual center of the brain of viewer 1104 to be perceived as a three-dimensional image or view.

In such an embodiment, first and second images 706a and 706b may be formed by display system 700 such that their centers are spaced apart a width of a user's pupils (e.g., an "interocular distance" 1106). For example, the spacing of first and second images 706a and 706b may be approximately 65 mm (or other suitable spacing) to generally be equivalent to interocular distance 1106. As described above, multiple instances of first and second images 706a and 706b may be formed by display system 700 that repeat in a viewing space. Thus, first and second images 706a and 706b shown in FIG. 11 that coincide with the left and right eyes of viewer 1104 may be adjacent first and second images 706a and 706b of the repeating instances that are separated by interocular distance 1106. Alternatively, first and second images 706a and 706b shown in FIG. 11 coinciding with the left and right eyes of viewer 1104 may be separated by one or more instances of first and second images 706a and 706b of the repeating instances that happen to be separated by interocular distance 1106. As such, display system 700 has a single viewing plane or surface (e.g., a plane or surface of pixel array 702, barrier element array 704, or display screen of display system 700) that supports one or more viewers with media content in the form of the images or views. In the embodiment of FIG. 7, the single viewing plane of display system 700 may provide a three-dimensional view based on three-dimensional media content.

It is noted that viewer 1104 of FIG. 11 may change positions in viewing space 106 (FIG. 1), and as such parallax barrier 104 may adapt to a different parallax barrier configuration to cause the three-dimensional view to be moved from the first position of viewer 1104 to the second position of viewer 1104. In such case, referring to FIG. 2A or 2B, barrier array controller 206 may generate control signal 216 to configure barrier element array 210 to include transparent strips of barrier elements configured to enable the three-dimensional view to be formed at the second position. The next subsection describes example embodiments for configuring barrier element array 210 into further configurations of blocking and non-blocking states to provide viewers with modified three-dimensional views.

Furthermore, although FIGS. 7 and 11 show display system 700 having a configuration similar to display system 200 of FIG. 2A, alternatively, display system 700 may be configured similarly to display system 220 of FIG. 2B to generate images 706*a* and 706*b* in viewing space 726. In such an embodiment, barrier element array 704 may be positioned between a backlighting panel (that is positioned where pixel array 702 is shown in FIGS. 7 and 10) and pixel array 702, and pixel array 702 is configured as a light filter (is not light emitting). The backlighting panel emits light that is filtered by barrier element array 704 as described above, and the filtered light is filtered by pixel array 702 to impose images on the light filtered by pixel array 702, forming images 706*a* and 706*b* as shown in FIGS. 7 and 10.

As described above, in an embodiment, display system 700 may be configured to generate a two-dimensional image for viewing by users in a viewing space. For example, flowchart 600 (FIG. 6) may optionally include a step 1202 shown in FIG. 12 to enable a two-dimensional view to be delivered to users, according to an embodiment. In step 1202, the array of barrier elements is configured into a third configuration to deliver a two-dimensional view. For example, in the third configuration, barrier array controller 206 may generate control signal 216 to configure each barrier element of barrier element array 210 to be in the non-blocking state (transparent). In such case, barrier element array 210 may be configured similarly to barrier element array 302 shown in FIG. 3, where all barrier elements 304 are selected to be non-blocking. If barrier element array 210 is non-blocking, barrier element array 210 functions as an "all pass" filter to substantially pass all of light 252 (FIG. 2A) or light 238 (FIG. 2B) as filtered light 110 to deliver the two-dimensional image generated by pixel array 208 to viewing space 106, to be viewable as a two-dimensional image in a similar fashion as a conventional display.

Figures 13, 14:
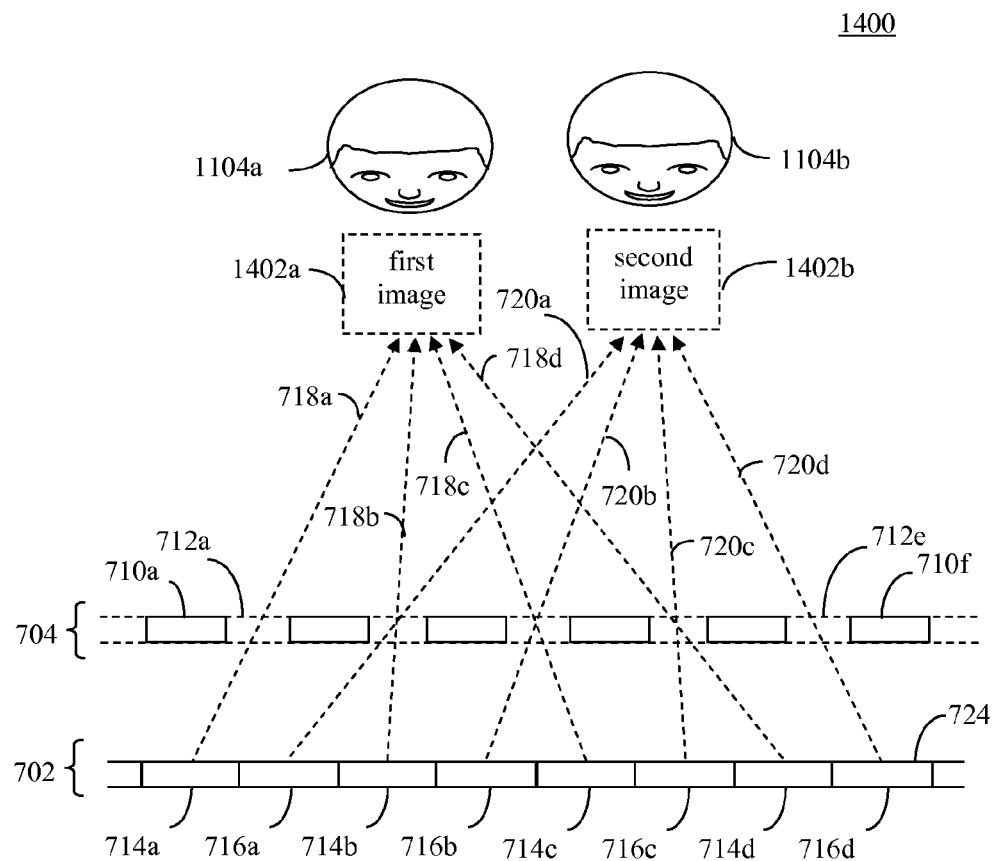
FIG. 13 shows a process for forming a plurality of two-dimensional images, according to an example embodiment.
FIG. 14 shows a display system providing two two-dimensional images that are correspondingly viewable by a first viewer and a second viewer, according to an example embodiment.

1. Embodiments for Delivering Multiple Views to Multiple Viewers Using a Single Light Manipulator In embodiments, display system 700 may be configured to generate multiple two-dimensional images or views for viewing by users in a viewing space. For example, flowchart 600 (FIG. 6) may optionally include a step 1302 shown in FIG. 13, according to an embodiment. In step 1302, the array of barrier elements is configured to deliver a plurality of two-dimensional views. For example, FIG. 14 shows display system 1400 of FIG. 14 configured to deliver two two-dimensional images, according to an embodiment. Display system 1400 is configured similarly to display system 700 of FIG. 7. As shown in FIG. 14, display system 1400 includes pixel array 702 and barrier element array 704, which generate first and second images 1402*a* and 1402*b*. As shown in FIG. 14, a first viewer 1104*a* receives first image 1402*a* at a first location and a second viewer 1104*b* receives second image 1402*b* at a second location, according to an example embodiment. Similarly to the description provided above with respect to FIG. 11, first and second images 1402*a* and 1402*b* may be generated by first set of pixels 714*a*-714*d* and second set of pixels 716*a*-716*d* of pixel array 702. However, rather than first and second images 1402*a* and 1402*b* being images that are of different perspective, first and second images 1402*a* and 1402*b* are each a two-dimensional image that may be viewed independently from each other. For instance, image 1402*a* and image 1402*b* may generated by display system 700 from first media content and second media content, respectively, that are independent of each other. Image 1402*a* may be received by both eyes of first viewer 1104*a* to be perceived by first viewer 1104*a* as a first two-dimensional image, and image 1402*b* may be received by both eyes of second viewer 1104*b* to be perceived by second viewer 1104*b* as a second two-dimensional image. Thus, first and second images 1402*a* and 1402*b* may be generated to have a spacing that enables them to be separately viewed by first and second users 1104*a* and 1104*b*.

As such, display system 1400 has a single viewing plane or surface (e.g., a plane or surface of pixel array 702, barrier element array 704, and/or display screen of display system 700) that supports multiple viewers with media content in the form of images or views. In the embodiment of FIG. 14, the single viewing plane of display system 1400 may provide a first two-dimensional view based on first two-dimensional media content to first viewer 1104*a*, and may provide a second two-dimensional view based on second two-dimensional media content to second viewer 1104*b*. Barrier element array 704 causes the first media content to be presented to first viewer 1104*a* via a first area of the single viewing plane, but not to second viewer 1104*b*, while simultaneously causing the second media content to be presented to second viewer 1104*b* via a second area of the single viewing plane, but not to first viewer 1104*a*. Furthermore, the first area and second area of the single viewing plane that provide the first and second media content overlap each other at least in part, as barrier element array 704 enables both two-dimensional views to be provided from first set of pixels 714*a*-714*d* and second set of pixels 716*a*-716*d*, which are interleaved with each other. In the embodiment of FIG. 14, the first and second areas may be the same area—an area of a display screen or surface of display system 1400.

Still further, the configuration of display system 1400 in FIG. 14 may be used to deliver separate three-dimensional content to first and second viewers 1104*a* and 1104*b*. As such, display system 1400 is capable of delivering multiple three-dimensional views to viewers. For example, in an embodiment, first and second viewers 1104*a* and 1104*b* may each wear a pair of 3D-enabled glasses, and the first and second media content associated with image 1402*a* and 1402*b* may be three-dimensional media content. In one embodiment, the 3D-enabled glasses may be color filtering glasses. The color filter lenses of the glasses worn by first viewer 1104*a* may pass two-dimensional images (included in image 1402*a*) of differing perspective to the left and right eyes of second viewer 1102*a* to be perceived by viewer 1102*a* as a first three dimensional image. Likewise, the color filter lenses of the glasses worn by second viewer 1104*b* may pass two-dimensional images (included in image 1402*b*) of differing perspective to the left and right eyes of second viewer 1102*b* to be perceived by viewer 1102*b* as a second three dimensional image. In another embodiment, the 3D-enabled glasses may be shutter lensed glasses. The shutter lenses of the glasses worn by first viewer 1104*a* may be synchronized to pass two-dimensional images (included in image 1402*a*) of differing perspective to the left and right eyes of viewer 1102*a* to be perceived by viewer 1102*a* as a first three dimensional image. Likewise, the shutter lenses of the glasses worn by second viewer 1104*b* may be synchronized to pass two-dimensional images (included in image 1402*b*) of differing perspective to the left and right eyes of second viewer 1102*b* to be perceived by viewer 1102*b* as a second three dimensional image.

As such, display system 1400 has a single viewing plane or surface (e.g., a plane or surface of pixel array 702 or barrier element array 704) that supports multiple viewers with media content in the form of three-dimensional images or views. The single viewing plane of display system 1400 may provide a first three-dimensional view based on first three-dimensional media content to first viewer 1104*a*, and may provide a second three-dimensional view based on second three-dimensional media content to second viewer 1104b. Barrier element array 704 causes the first three-dimensional media content to be presented to first viewer 1104a via a first area of the single viewing plane, but not to second viewer 1104b, while simultaneously causing the second three-dimensional media content to be presented to second viewer 1104b via a second area of the single viewing plane, but not to first viewer 1104a. Furthermore, the first area and second area of the single viewing plane that provide the first and second media content overlap each other at least in part, as barrier element array 704 enables both three-dimensional views to be provided from first set of pixels 714a-714d and second set of pixels 716a-716d, which are interleaved with each other. In the embodiment of FIG. 14, the first and second areas may be the same area—an area of a display screen or surface of display system 1400.

As such, display system 1400 can be configured to deliver a single three-dimensional view to a viewer (e.g., as shown in FIG. 11 for display system 700), to deliver a pair of two-dimensional views to a pair of viewers (e.g., as shown in FIG. 14), or to deliver a pair of three-dimensional views to a pair of viewers (e.g., as described in the preceding paragraph). Display system 1400 can be configured to switch between delivering views to one and two viewers by turning off or turning on, respectively, the display of media content by pixel array 702 associated with one of the viewers (e.g., by turning off or on pixels 716 associated with second image 1402b). Display system 1400 can be configured to switch between delivering two-dimensional and three-dimensional views by providing the corresponding media content type at pixel array 702. Furthermore, display system 1400 may provide such capabilities when configured similarly to display system 220 shown in FIG. 2B (e.g., including backlighting 116).

2. Example Multi-Three-Dimensional Image Display Embodiments

In an embodiment, display system 700 may be configured to generate multiple three-dimensional images that include related image content (e.g., each three-dimensional image is a different viewpoint of a common scene), or that each include unrelated image content, for viewing by users in a viewing space. Each of the three-dimensional images may correspond to a pair of images generated by pixels of the pixel array. The barrier element array filters light from the pixel array to form the image pairs in a viewing space to be perceived by users as three-dimensional images.

For instance, FIG. 15 shows a flowchart 1500 for generating multiple three-dimensional images, according to an example embodiment. Flowchart 1500 is described with respect to FIG. 16, which shows a cross-sectional view of a display system 1600. Display system 1600 is an example embodiment of system 200 shown in FIG. 2. As shown in FIG. 16, system 1600 includes a pixel array 1602 and a barrier element array 1604. System 1600 may also include display controller 202 of FIG. 2, which is not shown in FIG. 16 for ease of illustration. Further structural and operational embodiments will be apparent to persons skilled in the relevant art(s) based on the discussion regarding flowchart 1500. Flowchart 1500 is described as follows.

Flowchart 1500 begins with step 1502. In step 1502, light is received from an array of pixels that includes a plurality of pairs of sets of pixels. For instance, in the example of FIG. 16, pixel array 1602 includes a first set of pixels 1614a-1614d, a second set of pixels 1616a-1616d, a third set of pixels 1618a-1618d, and a fourth set of pixels 1620a-1620d. Each of pixels 1614a-1614d, 1616a-1616d, 1618a-1618d, 1620a-1620d generates light, which emanates from the surface of pixel array 1602 towards barrier element array 1604. Each set of pixels generates a corresponding image. First set of pixels 1614a-1614d and third set of pixels 1618a-1618d are configured to generate images that combine to form a first three-dimensional image. Second set of pixels 1616a-1616d and fourth set of pixels 1620a-1620d are configured to generate images that combine to form a second three-dimensional image. Pixels of the four sets of pixels are alternated in pixel array 1602 in the order of pixel 1614a, pixel 1616a, pixel 1618a, pixel 1620a, pixel 1614b, pixel 1616b, etc. Further pixels may be included in each set of pixels in pixel array 1602 that are not visible in FIG. 16, including hundreds, thousands, or millions of pixels in each set of pixels.

Figure 17:
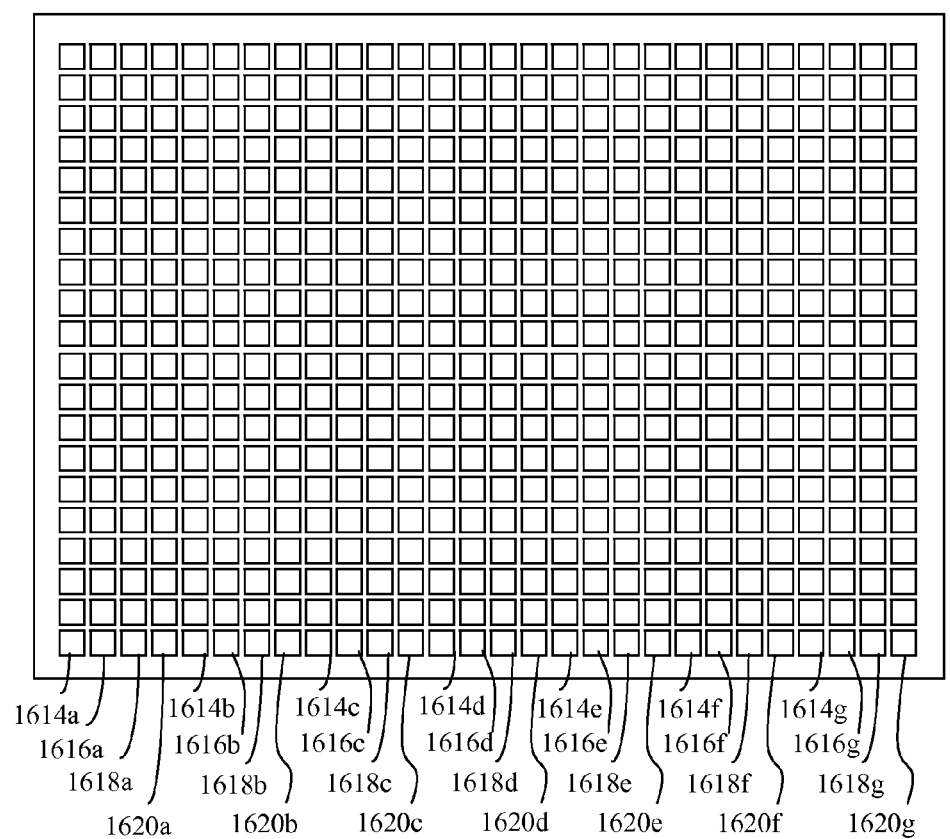
FIG. 17 shows a view of a surface of a pixel array, according to an example embodiment.

For instance, FIG. 17 shows a view of a surface of pixel array 1602, according to an example embodiment. As shown in FIG. 17, pixel array 1602 includes a plurality of pixels arranged in a two-dimensional array (e.g., arranged in a grid), including pixels 1614a-1614g, 1616a-1616g, 1618a-1618g, 1620a-1620g (at a bottom row of pixel array 1602 in FIG. 17). The pixels of pixel array 1602 may be arranged in other ways, in alternative embodiments. Each pixel is shown in FIG. 17 as rectangular (e.g., square) in shape, but in other embodiments may have other shapes. Furthermore, as described above, each pixel may include a plurality of sub-pixels. Pixel array 1602 may include any number of pixels. For example, in FIG. 17, pixel array 1602 includes twenty-eight pixels along an x-axis and includes twenty pixels along a y-axis, for a total number of five hundred and sixty pixels. However, these dimensions of pixel array 1602 and the total number of pixels for pixel array 1602 shown in FIG. 17 are provided for illustrative purposes, and are not intended to be limiting. Pixel array 1602 may include any number of pixels, and may have any array dimensions, including hundreds, thousands, or even larger numbers of pixels along each of the x- and y-axes.

As described above, in the current embodiment, pixel array 1602 is segmented into a plurality of pairs of sets of pixels. For instance, in the example of FIG. 16, pixel array 1602 is segmented into four sets of pixels. The first set of pixels includes pixels 1614a-1614g and the other pixels in the same columns, the second set of pixels includes pixels 1616a-1616g and the other pixels in the same columns, pixels 1618a-1618g and the other pixels in the same columns, and pixels 1620a-1620g and the other pixels in the same columns.

In step 1504, a plurality of strips of barrier elements of a barrier element array is selected to be non-blocking to form a plurality of parallel non-blocking slits. As shown in FIG. 16, barrier element array 1604 includes barrier elements that are each either non-blocking or blocking. Barrier elements that are blocking are indicated as barrier elements 1610a-1610f, and barrier elements that are non-blocking are indicated as barrier elements 1612a-1612e. Further barrier elements may be included in barrier element array 1604 that are not visible in FIG. 16, including hundreds, thousands, or millions of barrier elements, etc. Each of barrier elements 1610a-1610f and 1612a-1612e may include one or more barrier elements. Barrier elements 1610 alternate with barrier elements 1612. In this manner, blocking barrier elements 1610 are alternated with non-blocking barrier elements 1612 to form a plurality of parallel non-blocking slits in barrier element array 1604 (e.g., similar to barrier element array 304 shown in FIG. 8).

In step 1506, the light is filtered at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images. As shown in FIG. 16, light emanating from pixel array 1602 is filtered by barrier element array 1604 to form a plurality of images in a viewing space 1626. For instance, four images are formed in viewing space 1626, including first-fourth images 1606a-1606d. Pixels 1614a-1614d correspond to first image 1606a, pixels 1616a-1616d correspond to second image 1606b, pixels 1618a-1618d correspond to third image 1606c, and pixels 1620a-1620d correspond to fourth image 1606d. As shown in FIG. 16, light 1622a-1622d from the first set of pixels 1614a-1614d forms first image 1606a, and light 1624a-1624d from the third set of pixels 1618a-1618d forms third image 1606c, due to the filtering of the non-blocking slits (corresponding to non-blocking barrier elements 1612a-1612e) in barrier element array 1604. Although not indicated in FIG. 16 (for ease of illustration), in a similar fashion, light from the second set of pixels 1616a-1616d forms second image 1606b, and light from the fourth set of pixels 1620a-1620d forms fourth image 1606d.

In the embodiment of FIG. 16, any pair of images of images 1606a-1606d may be configured to be perceived as a three-dimensional image by a user in viewing space 1626 (similarly to user 1204 in FIG. 12). For instance, first and third images 1606a and 1606c may be configured to be perceived by a user as a first three-dimensional image, such that first image 1606a is received at a first eye location and third image 1606c is received at a second eye location of a user. Furthermore, second and fourth images 1606b and 1606d may be configured to be perceived by a user as a second three-dimensional image, such that second image 1606b is received at a first eye location and fourth image 1606d is received at a second eye location of a user.

In the example of FIG. 16, two three-dimensional images are provided by system 1600. In further embodiments, further numbers of three-dimensional images may be provided, including a third three-dimensional image, a fourth three-dimensional image, etc. In such case, each three-dimensional image is generated by filtering light (using a barrier element array) corresponding to an image pair generated by a corresponding pair of sets of pixels of the pixel array, in a similar fashion as described with respect to FIG. 16 for two three-dimensional images. For example, to provide three three-dimensional images, pixel array 1602 may include fifth and sixth sets of pixels that generate fifth and sixth images, respectively, to be perceived by a user as a third three-dimensional image. To provide a fourth three-dimensional image, pixel array 1602 may include seventh and eighth sets of pixels that generate seventh and eighth images, respectively, to be perceived by a user as the fourth three-dimensional image.

In FIG. 16, the first and second three-dimensional images generated based on first and third images 1606a and 1606c and second and fourth images 1606b and 1606d, respectively, and any further three-dimensional images that may be generated, may include related image content or may each include unrelated image content. For example, in an embodiment, the first and second three-dimensional images (and any further three-dimensional images) may have been captured as different viewpoints of a common scene. Thus, a user in viewing space 1626 that moves laterally to sequentially view the first and second three-dimensional images (and any further three-dimensional images) may perceive being able to partially or fully "view behind" objects of the common scene.

It is noted that multiple instances of each of first-fourth images 1606a-1608d may be formed in viewing space 1626 in a repeating fashion (with diminishing intensity when moving away from the most centrally located images) due to filtering by barrier element array 1604, in a similar fashion as described in the prior section (for images 706a and 706b). For instance, FIG. 16 indicates a first instance of third image 1606c is next to a first image of fourth image 1606d, which is next to a first instance of first image 1606a, followed by a first instance of second image 1606b, followed by a second instance of third image 1606c, followed by a second instance of fourth image 1606d, followed by a second instance of first image 1606a, followed by a second instance of second image 1606b. Each instance of first-fourth images 1606a-1608d is generated by light emanating from first-fourth sets of pixels 1614a-1614d, 1616a-1616d, 1618a-1618d, and 1620a-1620d, respectively, due to the light from the each pixel set passing through a different non-blocking slit of barrier element array 1604 for each instance. Further instances of first-fourth images 1606a-1606d that are not shown in FIG. 16 may repeat in viewing space 1626 in a similar fashion (but are not shown for ease of illustration). In the example of FIG. 16, the additional instances of first and third images 1606a and 1606c and of second and fourth images 1606b and 1606d may be respectively perceived as the first and second three-dimensional images by users in viewing space 1626.

C. Example Embodiments for Delivering Views Using Multiple Light Manipulators

Multiple three-dimensional images may be displayed in a viewing space using multiple light manipulator layers, according to embodiments. In embodiments, the multiple light manipulating layers may enable spatial separation of the images. For instance, in such an embodiment, for example, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In embodiments, a display device may be configured to display any number of spatially separated three-dimensional images, as desired for a particular application (e.g., according to a number and spacing of viewers in the viewing space, etc.).

Figure 18:
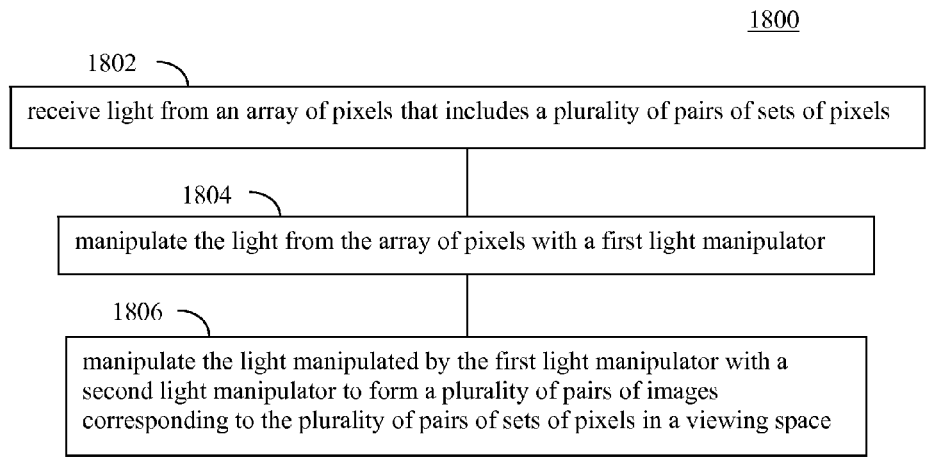
FIG. 18 shows a flowchart for generating multiple three-dimensional images using multiple light manipulator layers, according to an example embodiment.
Figure 19:
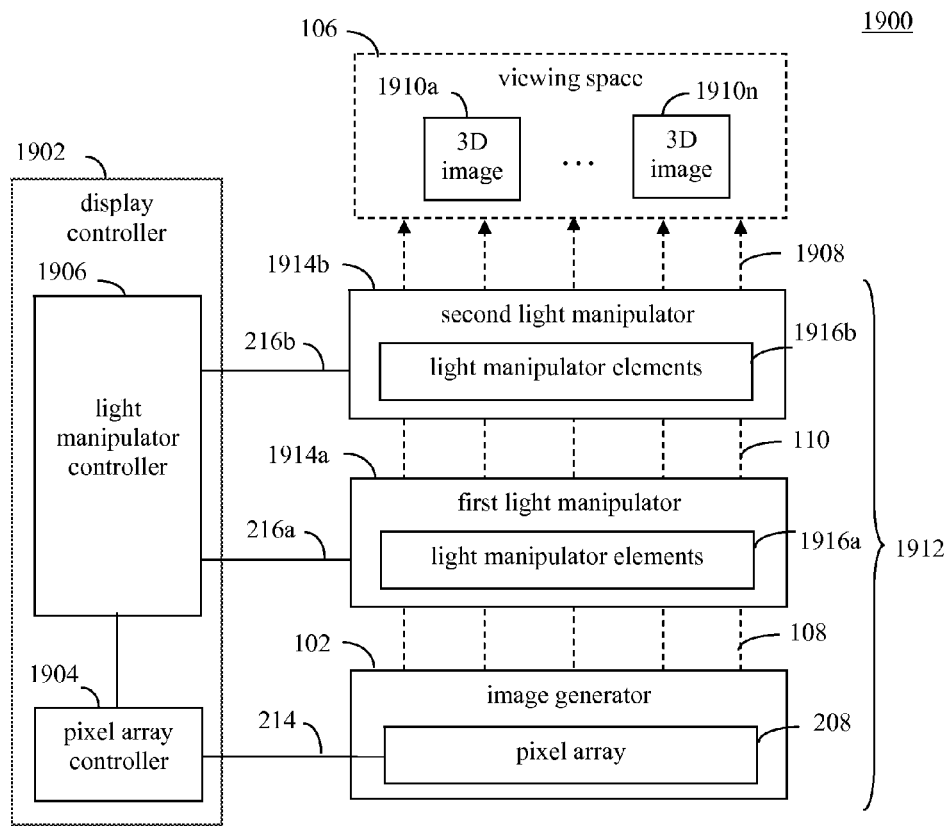
FIG. 19 shows a block diagram of a display system, according to an example embodiment.

For instance, FIG. 18 shows a flowchart 1800 for generating multiple three-dimensional images using multiple light manipulator layers, according to an example embodiment. Flowchart 1800 is described with respect to FIG. 19, which shows a cross-sectional view of a display system 1900 that includes multiple light manipulator layers, according to an example embodiment. As shown in FIG. 19, system 1900 includes a display controller 1902 and a display device 1912. Display device 1912 includes image generator 102, a first light manipulator 1914a, and a second light manipulator 1914b. As shown in FIG. 19, image generator 102 includes pixel array 208, first light manipulator 1914a includes first light manipulator elements 1916a, and second light manipulator 1914b includes second light manipulator elements 1916b. Furthermore, as shown in FIG. 19, display controller 1902 includes a pixel array controller 1904 and a light manipulator controller 1906. Flowchart 1800 and system 1900 are described as follows.

Flowchart 1800 begins with step 1802. In step 1802, light is received from an array of pixels that includes a plurality of pairs of sets of pixels. For example, as shown in FIG. 19, light 108 is received at first light manipulator 1914a from pixel array 208 of image generator 102. Each pixel of pixel array 208 may generate light that is received at first light manipulator 1914a. In an embodiment, pixel array controller 1904 may generate control signal 214 to cause pixel array 208 to emit light 108 containing a plurality of images corresponding to the sets of pixels.

In step 1804, the light from the array of pixels is manipulated with a first light manipulator. For example, first light manipulator 1914a may be configured to manipulate light 108 received from pixel array 208. As shown in FIG. 19, first light manipulator 1914a includes light manipulator elements 1916a configured to perform manipulating (e.g., filtering, diverting, etc.) of light 108 to generate manipulated light 110. Light manipulator elements 1916a may optionally be configurable to adjust the manipulating performed by first light manipulator 1914a. First light manipulator 1914a may perform filtering in a similar manner as parallax barrier 104 described above or in other manner. In another embodiment, first light manipulator 1914a may include a lenticular lens that diverts light 108 to perform light manipulating, generating manipulated light 110. In an embodiment, light manipulator controller 1906 may generate control signal 216a to cause light manipulator elements 1916a to manipulate light 108 as desired.

In step 1806, the light manipulated by the first light manipulator is manipulated with a second light manipulator to form a plurality of pairs of images corresponding to the plurality of pairs of sets of pixels in a viewing space. For example, as shown in FIG. 19, manipulated light 110 is received by second light manipulator 1914b to generate manipulated light 1908 that includes a plurality of three-dimensional images 1910a-1910n formed in viewing space 106. As shown in FIG. 19, second light manipulator 1914b includes light manipulator elements 1916b configured to perform manipulating of manipulated light 110 to generate manipulated light 1908. Light manipulator elements 1916b may optionally be configurable to adjust the manipulating performed by second light manipulator 1914b. In an embodiment, light manipulator controller 1906 may generate control signal 216b to cause light manipulator elements 1916b to manipulate manipulated light 110 to generate manipulated light 1908 including three-dimensional images 1910a-1910n as desired.

As such, display system 1900 has a single viewing plane or surface (e.g., a plane or surface of pixel array 208, first light manipulator 1914a, second light manipulator 1914b, or a display screen of display system 1900) that supports multiple viewers with media content in the form of three-dimensional images or views. The single viewing plane of display system 1900 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 1914a and 1914b cause each three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 19, the areas may be the same area—an area of a display screen or surface of display system 1900. As such, multiple three-dimensional views that are each viewable by a corresponding viewer may be delivered by a single display viewing plane.

Display system 1900 may be configured in various ways to generate multiple three-dimensional images according to flowchart 1800, in embodiments. Furthermore, as described below, embodiments of display system 1900 may be configured to generate two-dimensional views, as well as any combination of one or more two-dimensional views simultaneously with one or more three-dimensional views. Examples of such embodiments are provided in the following subsections.

1. Example Embodiments Using Multiple Parallax Barriers

Figure 20:
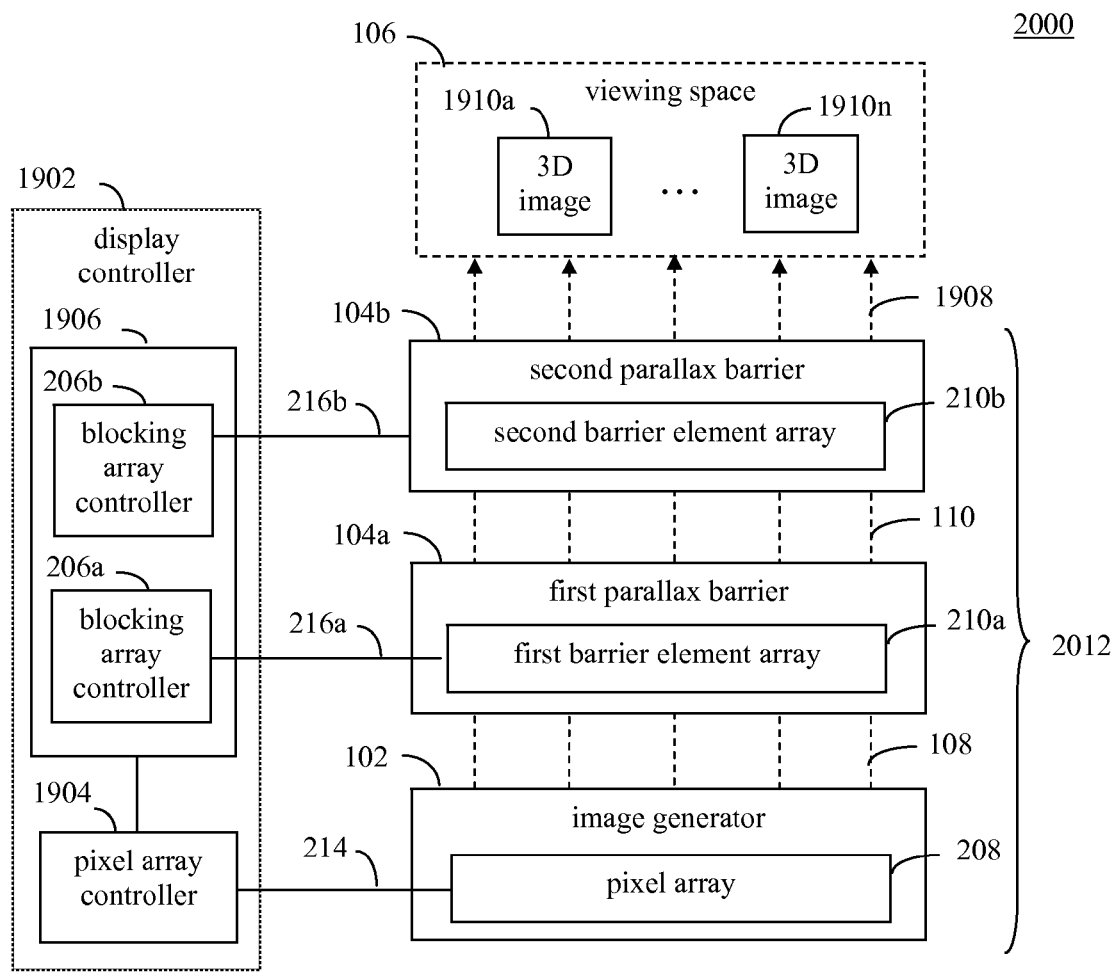
FIG. 20 shows a block diagram of a display system that is an example of the display system of FIG. 19, according to an embodiment.

In an embodiment, delivery of three-dimensional images may be performed in system 1900 using multiple parallax barriers. For instance, FIG. 20 shows a block diagram of a display system 2000, which is an example of system 1900 shown in FIG. 19, according to an embodiment. Display system 2000 is configured to display multiple three-dimensional images in a viewing space in a spatially separated manner. As shown in FIG. 20, system 2000 includes display controller 1902 and a display device 2012. Display device 2012 includes image generator 102, a first parallax barrier 104a, and a second parallax barrier 104b. First parallax barrier 104a is an example of first light manipulator 1904a, and second parallax barrier 104b is an example of second light manipulator 1904b. As shown in FIG. 20, image generator 102 includes pixel array 208, first parallax barrier 104a includes a first barrier element array 210a, and second parallax barrier 104b includes a second barrier element array 210b. First barrier element array 210a is an example of light manipulator elements 1916a, and second barrier element array 210b is an example of light manipulator elements 1916b. Furthermore, as shown in FIG. 20, display controller 1902 includes pixel array controller 1904 and light manipulator controller 1906. Light manipulator controller 1906 includes a first blocking array controller 206a coupled to first barrier element array 210a and a second blocking array controller 206b coupled to second barrier element array 210b. These features of system 2000 are described as follows.

As described above, pixel array 208 includes a two-dimensional array of pixels, with each pixel of pixel array 208 configured to emit light included in light 108. First parallax barrier 104a is positioned proximate to a surface of pixel array 208. Second parallax barrier 104b is positioned proximate to a surface of first parallax barrier 104a. First barrier element array 210a is a layer of first parallax barrier 104a, and second barrier element array 210b is a layer of second parallax barrier 104b. First and second barrier element arrays 210a and 210b each include a plurality of barrier elements arranged in an array. Barrier elements of first and/or second barrier element arrays 210a and 210b may be configured to be selectively blocking or non-blocking, as described above for barrier element array 210 of FIG. 2.

Display controller 1902 is configured to generate control signals to enable display device 1912 to display spatially separated three-dimensional images 1910a-1910n to users in viewing space 106. For example, similarly to pixel array controller 204 described above, pixel array controller 1904 is configured to generate a control signal 214 that is received by pixel array 208. Control signal 214 may include one or more control signals used to cause pixels of pixel array 208 to emit light 108 of particular desired colors and/or intensity. Similarly to blocking array controller 206 described above, light manipulator controller 1906 is configured to generate control signals, including a first control signal 216a and a second control signal 216b. First control signal 216a is received by first barrier element array 210a. First control signal 216a may include one or more control signals used to cause the barrier elements of first barrier element array 210a to be non-blocking or blocking. Likewise, second control signal 216b is received by second barrier element array 210b. Second control signal 216b may include one or more control signals used to cause the barrier elements of second barrier element array 210b to be non-blocking or blocking. In this manner, first barrier element array 210*a* filters light 108 to generate filtered light 110, and second barrier element array 210*b* filters filtered light 110 to generate filtered light 1908 that includes one or more three-dimensional images 1910 that may be viewed by users in viewing space 106. Three-dimensional images 1910 are spatially separated in viewing space 106 as dictated by the configurations of first and second barrier element arrays 210*a* and 210*b* relative to pixel array 208.

Figure 21:
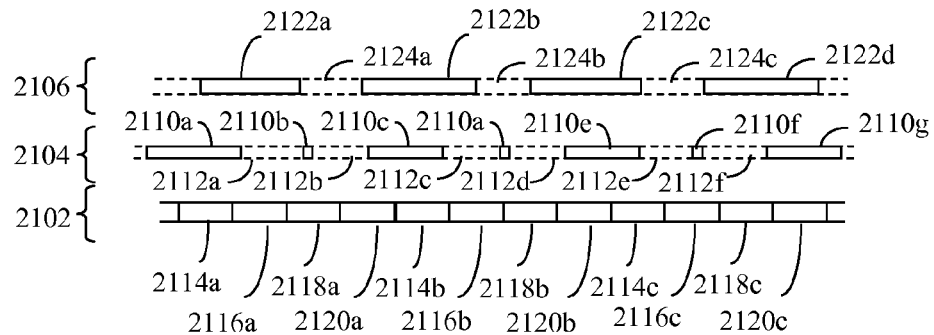
FIGS. 21 and 22 show cross-sectional views of a display system, according to an example embodiment.

For instance, FIG. 21 shows a cross-sectional view of a display system 2100, according to an example embodiment. Display system 2100 is an example of system 2000 shown in FIG. 20. As shown in FIG. 21, system 2100 includes a pixel array 2102, a first barrier element array 2104, and a second barrier element array 2106. System 2100 may also include display controller 1902 of FIG. 20, which is not shown in FIG. 21 for ease of illustration. System 2100 is described as follows.

As shown in the example of FIG. 21, pixel array 2102 includes a first set of pixels 2114*a*-2114*c*, a second set of pixels 2116*a*-2116*c*, a third set of pixels 2118*a*-2118*c*, and a fourth set of pixels 2120*a*-2120*c*. Pixels of the four sets of pixels are alternated in pixel array 2102 in the order of pixel 2114*a*, pixel 2116*a*, pixel 2118*a*, pixel 2120*a*, pixel 2114*b*, pixel 2116*b*, etc. Further pixels may be included in each set of pixels in pixel array 2102 that are not visible in FIG. 21, including hundreds, thousands, or millions of pixels in each set of pixels. FIG. 17 shows a pixel array 1602 (described above), which is an example of pixel array 2102.

Figure 22:
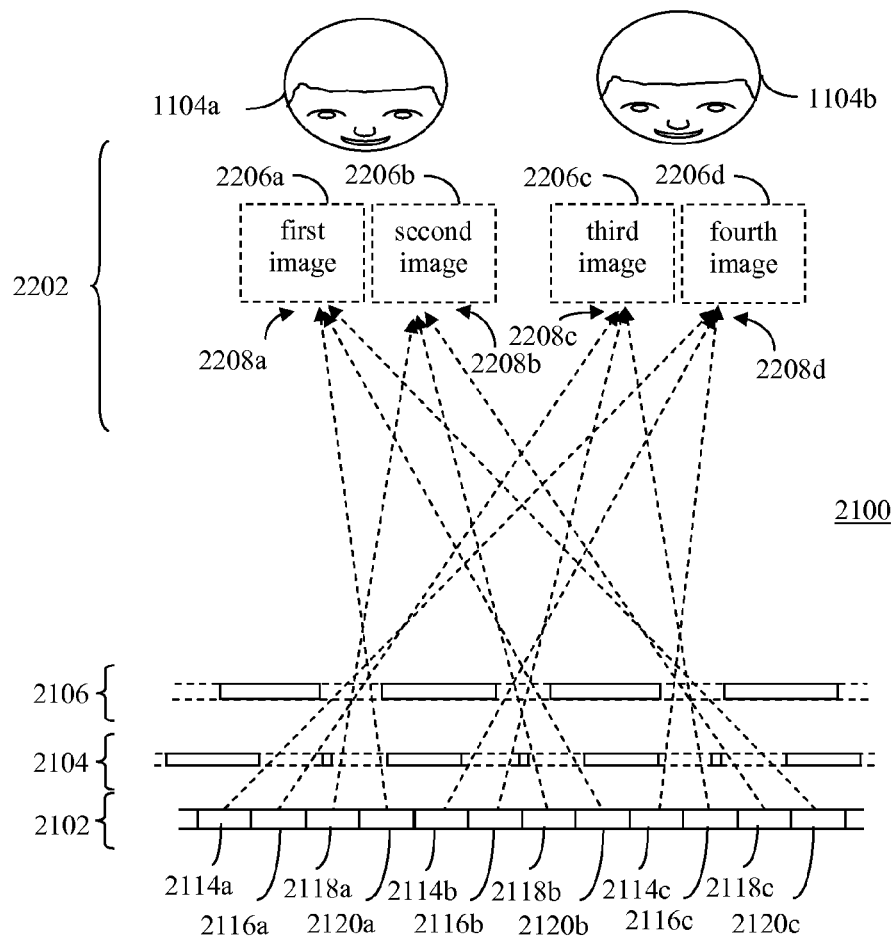

Each of pixels 2114*a*-2114*c*, 2116*a*-2116*c*, 2118*a*-2118*c*, and 2120*a*-2120*c* is configured to generate light, which emanates from the surface of pixel array 2102 towards first barrier element array 2104. Each set of pixels is configured to generate a corresponding image. For example, FIG. 22 shows display system 2100, where pixels of pixel array 2102 emit light. Light from second set of pixels 2116*a*-2116*c* and first set of pixels 2114*a*-2114*c* is configured to generate third and fourth images 2206*c* and 2206*d*, respectively, that may be perceived together as a second three-dimensional image by a second viewer 1104*b*. Light from fourth set of pixels 2120*a*-2120*c* and third set of pixels 2118*a*-2118*c* is configured to generate first and second images 2206*a* and 2206*b*, respectively, that may be perceived together as a first three-dimensional image by a first viewer 1104*a*. The light emitted by the sets of pixels is filtered by first and second barrier element arrays 2104 and 2106 to generate the first and second three-dimensional images in respective desired regions of a user space 2202 adjacent to display system 2100.

For illustrative purposes, example operation of display system 2100 is described as follows with respect to flowchart 1800 of FIG. 18. In step 1802, light is received from an array of pixels that includes a plurality of pairs of sets of pixels. For example, as shown in FIG. 22, pixels 2114*a*-2114*c*, 2116*a*-2116*c*, 2118*a*-2118*c*, 2120*a*-2120*c* each emit light, which is received at first barrier element array 2104.

In step 1804, the light from the array of pixels is manipulated with a first light manipulator. For example, as shown in FIG. 21, first barrier element array 2104 includes barrier elements that are each either non-blocking or blocking. Barrier elements that are selected to be blocking are indicated as barrier elements 2110*a*-2110*g*, and barrier elements that are selected to be non-blocking (indicated by dotted line) are indicated as barrier elements 2112*a*-2112*f* (first barrier element array 2104 may include further barrier elements that are not shown in FIG. 21). Blocking barrier elements 2110 alternate with non-blocking barrier elements 2112 to form a plurality of parallel non-blocking slits in first barrier element array 2104 (e.g., similar to barrier element array 304 shown in FIG. 8). As shown in FIG. 22, light emanating from pixel array 2102 is filtered by the parallel non-blocking slits in first barrier element array 2104. The non-blocking slits of first barrier element array 2104 may be configured to filter light from pixel array 2102 in similar manner as described above for barrier element array 1604 of FIG. 16.

In step 1806, the light manipulated by the first light manipulator is manipulated with a second light manipulator to form a plurality of pairs of images corresponding to the plurality of pairs of sets of pixels in a viewing space. For example, as shown in FIG. 22, light filtered by first barrier element array 2104 is filtered by second blocking array 2106 to form a plurality of images in a viewing space 2202. As shown in FIG. 21, second barrier element array 2106 includes barrier elements 2124 selected to be non-blocking to form non-blocking slits (separated by barrier elements 2122 selected to be blocking). In an embodiment, in step 1804, the non-blocking slits of first barrier element array 2104 filter light from pixel array 2102 in similar manner as described above for barrier element array 1604 of FIG. 16 to generate a plurality of images (that may be repeating images), and in step 1806, the non-blocking slits of second barrier element array 2106 filter the light that is filtered by first barrier element array 2104 such that an instance of each the plurality of images is provided in a viewing space.

For instance, in the example of FIG. 22, four images are formed in viewing space 2202, including first-fourth images 2206*a*-2206*d*. Pixels 2114*a*-2114*c* correspond to fourth image 2206*d*, pixels 2116*a*-2116*c* correspond to third image 2206*c*, pixels 2118*a*-2118*c* correspond to second image 2206*b*, and pixels 2120*a*-2120*c* correspond to first image 2206*a*. As shown in FIG. 22, light from the first set of pixels 2114*a*-2114*c* forms fourth image 2206*d*, and light from the third set of pixels 2118*a*-2118*c* forms second image 2206*b*, due to the filtering of the non-blocking slits in first and second barrier element arrays 2104 and 2106. In a similar fashion, light from the second set of pixels 2116*a*-2116*c* forms third image 2206*c*, and light from the fourth set of pixels 2120*a*-2120*c* forms first image 2206*a*.

In the embodiment of FIG. 22, first and second images 2206*a* and 2206*b* may be configured to be perceived by viewer 1104*a* as a first three-dimensional image, such that first image 2206*a* is received at a right eye location 2208*a* of viewer 1104*a* and second image 2206*b* is received at a left eye location 2208*b* of viewer 1104*a* (e.g., separated by an interocular distance). Furthermore, third and fourth images 2206*c* and 2206*d* may be configured to be perceived by viewer 1104*b* as a second three-dimensional image, such that third image 2206*c* is received at a right eye location 2208*c* of viewer 1104*b* and fourth image 2206*d* is received at a second eye location 2208*d* of viewer 1104*b*.

First-fourth images 2206*a*-2206*d* may be formed in viewing space 2202 at a distance from pixel array 2102 and at a lateral location of viewing space 2202 as determined by a configuration of display system 2100, including a width and spacing of non-blocking slits in first barrier element array 2104, by a width and positioning of non-blocking slits in second barrier element array 2106, by a spacing between pixel array 2102 and first barrier element array 2104, and a spacing between first and second barrier element arrays 2104 and 2106.

Furthermore, although shown in FIG. 22 as simultaneously delivering first and second three-dimensional views to viewers 1104*a* and 1104*b*, display system 2100 may deliver a two-dimensional view to one of viewers 1104*a* and 1104*b*, and may simultaneously deliver a three-dimensional view to the other of viewers 1104*a* and 1104*b*. For example, pixels 2114a-2114c and pixels 2116a-2116c may deliver the same images (e.g., may display the same media content), such that third and fourth images 2206c and 2206d are the same. As such, because second viewer 1104b receives the same view at each of right and left eye locations 2208c and 2208d, second viewer 1104b perceives third and fourth images 2206c and 2206d as a single two-dimensional view. In another embodiment, to provide a two-dimensional view to viewer 1104b, pixels 2114a-2114c may be turned off, and a width of slits 2112a, 2112c, and 2112e may be adjusted such that pixels 2116a-2116c deliver a same view to both right and left eye locations 2208c and 2208d of viewer 1104b (through slits 2124a-2124c). Simultaneously to second viewer 1104b being delivered a two-dimensional view, first viewer 1104a may be delivered first and second images 2206a and 2206b as differing perspective images to be perceived as a three-dimensional view, or first and second images 2206a and 2206b may be delivered as a same image to deliver first viewer 1104a a two-dimensional view.

Still further, if it is desired for display system 2100 to deliver a single two-dimensional or three-dimensional view (e.g., one of viewers 1104a and 1104b is no longer participating), one or both of first barrier element array 2104 and second barrier element array 2106 may be "turned off." For instance, to deliver a two-dimensional view to a viewer 1104, first barrier element array 2104 and second barrier element array 2106 may each transition all of their corresponding barrier elements to the non-blocking state (be "turned off"), and pixel array 2102 may be configured to emit a single two-dimensional image. To deliver a three-dimensional view to a viewer 1104, one of first barrier element array 2104 and second barrier element array 2106 may transition all of its barrier elements to the non-blocking state, while the other of first barrier element array 2104 and second barrier element array 2106 may be configured to deliver a three-dimensional view as described elsewhere herein (e.g., as described above with respect to FIG. 11).

Although display system 2100 is shown in FIG. 22 as delivering two three-dimensional views to two viewers, as described further below, display system 2100 may be configured to deliver additional three-dimensional views. Display system 2100 may be configured to simultaneously deliver any number of two-dimensional and/or three-dimensional views to corresponding viewers.

Figure 23:
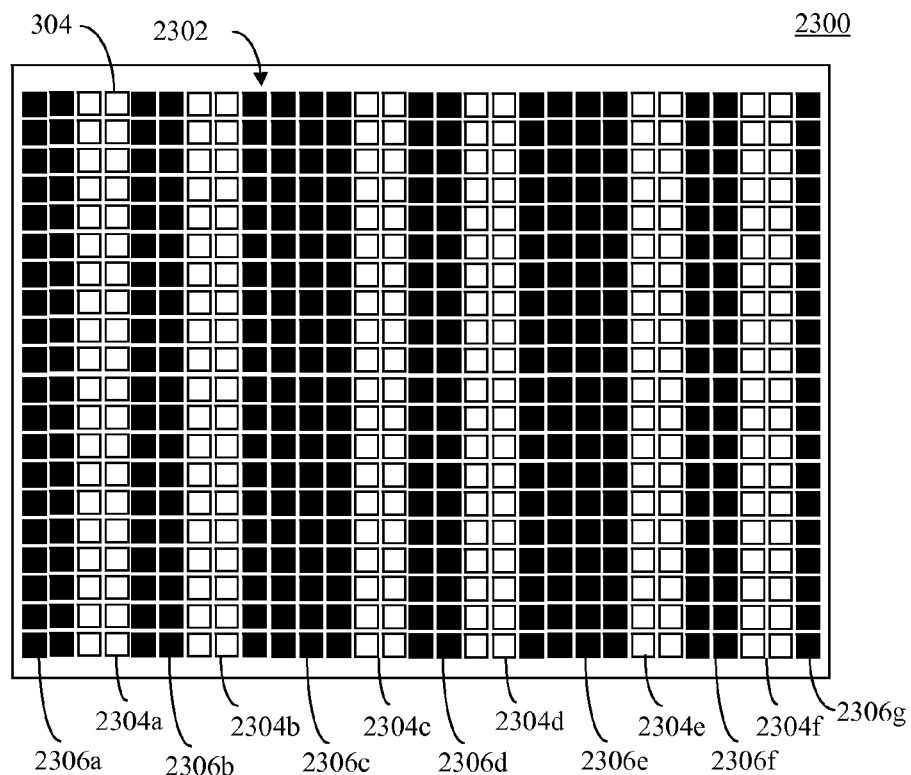
FIG. 23 shows a view of a first parallax barrier of a parallax barrier pair, according to an example embodiment.

First and second barrier element arrays 2104 and 2106 may have various configurations. For instance, FIG. 23 shows a view of a first parallax barrier 2300 that includes a first barrier element array 2302 with non-blocking slits, according to an example embodiment. First barrier element array 2302 is an example of first barrier element array 2104 of FIG. 21. As shown in FIG. 23, first barrier element array 2302 includes a plurality of barrier elements 304 arranged in a two-dimensional array. Furthermore, as shown in FIG. 23, first barrier element array 2302 includes a plurality of parallel strips of barrier elements 304 that are selected to be non-blocking to form a plurality of parallel non-blocking slits 2304a-2304f. Slits 2304a-2304f correspond to barrier elements 2112a-2112f in FIG. 21 that are selected to be non-blocking. As shown in FIG. 23, parallel non-blocking slits 2304a-2304f are alternated with parallel blocking strips 2306a-2306g of barrier elements 304 that are selected to be blocking (corresponding to barrier elements 2110a-2110g of FIG. 21). In the example of FIG. 23, non-blocking slits 2304a-2304f each have a width (along the x-dimension) of two barrier elements 304. Non-blocking slits 2304a-2304f include three groups (e.g., three pairs) of non-blocking slits: non-blocking slits 2304a and 2304b, non-blocking slits 2304c and 2304d, and non-blocking slits 2304e and 2304f. Each non-blocking slit group is separated from a next adjacent slit group by a blocking strip 2306 having a width of four barrier elements 304, and the non-blocking slits in each group are separated by a blocking strip 2306 having a width of two barrier elements 304. However, each of these non-blocking slit widths and blocking strip widths may be modified/selected as desired for a particular application, and are provided in FIG. 23 merely for purposes of illustration.

Figure 24:
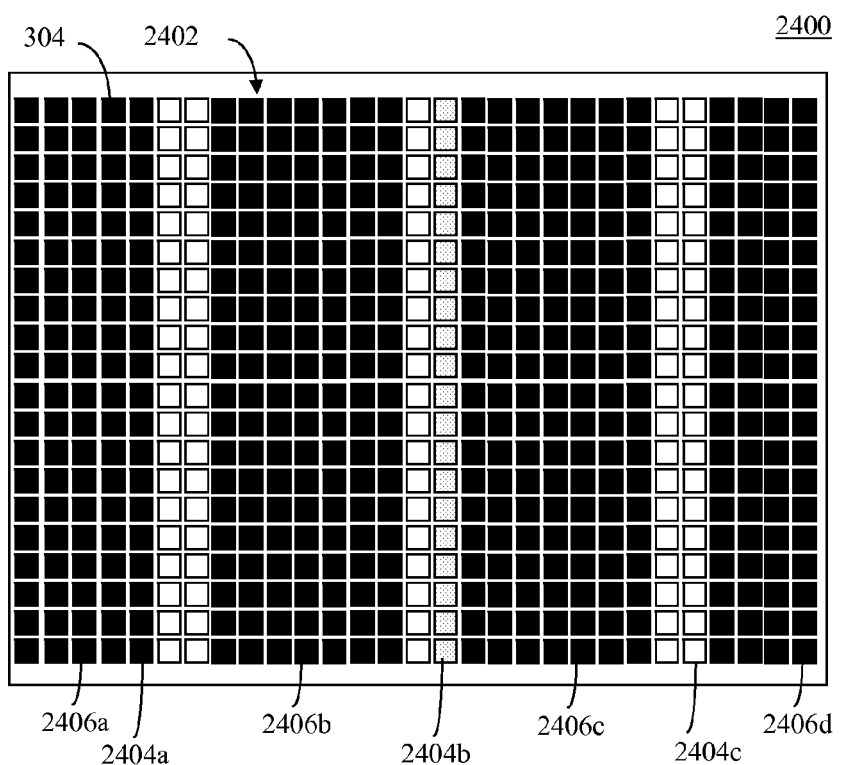
FIG. 24 shows a view of a second parallax barrier of a parallax barrier pair, according to an example embodiment.

FIG. 24 shows a view of a second parallax barrier 2400 that includes a second barrier element array 2402 with non-blocking slits, according to an example embodiment. Second barrier element array 2402 is an example of second barrier element array 2106 of FIG. 21. As shown in FIG. 24, second barrier element array 2402 includes a plurality of barrier elements 304 arranged in a two-dimensional array. Furthermore, as shown in FIG. 24, second barrier element array 2402 includes a plurality of parallel strips of barrier elements 304 that are selected to be non-blocking to form a plurality of parallel non-blocking slits 2404a-2404c. Slits 2404a-2404c correspond to barrier elements 2124a-2124c in FIG. 21 that are selected to be non-blocking. As shown in FIG. 24, parallel non-blocking slits 2404a-2404c are alternated with parallel blocking strips 2406a-2406d of barrier elements 304 that are selected to be blocking (corresponding to barrier elements 2122a-2122d of FIG. 21). In the example of FIG. 24, non-blocking slits 2404a-2404c each have a width (along the x-dimension) of two barrier elements 304, and are separated by a blocking strip 2406 having a width of seven barrier elements 304. However, each of these non-blocking slit widths and blocking strip widths may be modified as desired for a particular application, and are provided in FIG. 24 merely for purposes of illustration.

As shown in FIGS. 21 and 22 second barrier element array 2106 includes a slit (non-blocking barrier elements 2124) corresponding to each group of non-blocking slits of first barrier element array 2104 (non-blocking barrier elements 2112). For example, second barrier element array 2106 includes non-blocking barrier element(s) 2124a corresponding to non-blocking barrier elements 2112a and 2112b, includes non-blocking barrier element(s) 2124b corresponding to non-blocking barrier elements 2112c and 2112d, and includes non-blocking barrier element(s) 2124c corresponding to non-blocking slits 2112e and 2112f. As shown in FIG. 22, each slit formed by non-blocking barrier elements 2124 in second barrier element array 2106 filters light from pixel array 2102 that passes through the corresponding group of non-blocking slits formed by non-blocking barrier elements 2112 of first barrier element array 2104 to form a single instance of each of images 2206a-2206d in viewing space 2202. The configuration of second barrier element array 2106 (e.g., slit width, slit spacing, spacing from first barrier element array 2104) may be selected to focus light to form each of images 2206a-2206d at desired locations (e.g., a desired distance from pixel array 2102, at a lateral position in viewing space 2202, etc.).

For instance, as shown in FIG. 22, light from both of pixels 2114a and 2116a passes through non-blocking barrier element(s) 2112a of first barrier element array 2104, passes through non-blocking barrier element(s) 2124a of second barrier element array 2106 (crossing each other in the vicinity of second barrier element array 2106), to respectively be received at a focal point for fourth and third images 2206c and 2206d. Similarly, light from both of pixels 2118a and 2120a passes through non-blocking barrier element(s) 2112b of first barrier element array 2104, passes through non-blocking barrier element(s) 2124a of second barrier element array 2106

(crossing each other, and crossing light from pixels 2114a and 2116a in the vicinity of second barrier element array 2106), to respectively be received at a focal point for second and first images 2206c and 2206d. Light from pixels 2114b, 2114c, 2116b, 2116c, 2118b, 2118c, 2120b, and 2120c is similarly filtered by first and second barrier element arrays 2104 and 2106 by their corresponding slits.

As shown in FIG. 22, by angling light through slits of a non-blocking slit group in first barrier element array 2104 and through a single corresponding non-blocking slit in second barrier element array 2106, light associated with each of images 2206a-2206d can be spatially separated. For instance, as shown in FIG. 22, light associated with first and second images 2206a and 2206b is generally directed in a right-to-left path by the slits to form first and second images 2206a and 2206b in a left side of viewing space 2202. Furthermore, light associated with third and fourth images 2206c and 2206d is generally directed in a left-to-right path by the slits to form third and fourth images 2206c and 2206d in a right side of viewing space 2202.

In the example of FIG. 22, two three-dimensional images are provided by system 2100 (formed by first and second images 2206a and 2206b and third and fourth images 2206c and 2206d, respectively). In further embodiments, further numbers of three-dimensional images may be provided, including a third three-dimensional image, a fourth three-dimensional image, etc. In such case, each three-dimensional image is generated by filtering light (using a pair of barrier element arrays) corresponding to an image pair generated by a corresponding pair of sets of pixels of the pixel array, in a similar fashion as described with respect to FIG. 21 for two three-dimensional images. For example, to provide three three-dimensional images, pixel array 2102 may include fifth and sixth sets of pixels that generate fifth and sixth images, respectively, to be perceived by a user as a third three-dimensional image. To provide a fourth three-dimensional image, pixel array 2102 may include seventh and eighth sets of pixels that generate seventh and eighth images, respectively, to be perceived by a user as the fourth three-dimensional image. In each case, an additional non-blocking slit may be included in each non-blocking slit group of first barrier element array 2104 to enable the additional three-dimensional image to be formed. For instance, to form a third three-dimensional image in viewing space 2202, a third non-blocking slit may be formed in first barrier element array 2104 in the group of slits that includes non-blocking barrier elements 2112a and 2112b, in the group of slits that includes non-blocking barrier elements 2112c and 2112d, and in the group of slits that includes non-blocking barrier elements 2112e and 2112f to form groups that include trios of non-blocking slits (rather than pairs of non-blocking slits, as in the embodiment of FIGS. 21 and 22).

2. Example Light Manipulator Embodiments Including Lenticular Lenses

Figure 25:
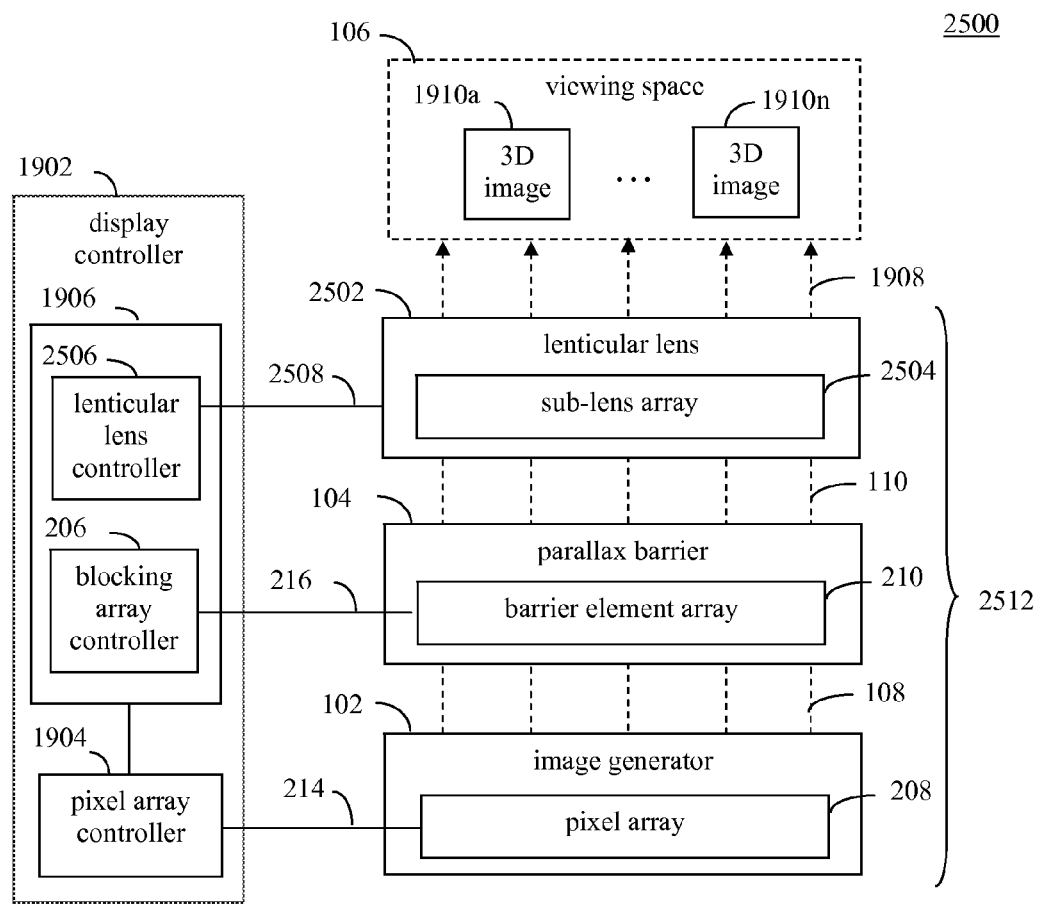
FIG. 25 shows a block diagram of a display system that is an example of the display system of FIG. 19, according to an embodiment.

In an embodiment, system 1900 of FIG. 19 may include one or more lenticular lenses as light manipulators used to deliver three-dimensional images and/or two-dimensional images. For instance, FIG. 25 shows a block diagram of a display system 2500, which is an example of system 1900 shown in FIG. 19, according to an embodiment. Display system 2500 is configured to display multiple three-dimensional images and/or two-dimensional images in a viewing space in a spatially separated manner. As shown in FIG. 25, system 2500 includes display controller 1902 and a display device 2512. Display device 2512 includes image generator 102, parallax barrier 104, and a lenticular lens 2502. Parallax barrier 104 is an example of first light manipulator 1904a, and lenticular lens 2502 is an example of second light manipulator 1904b. As shown in FIG. 25, image generator 102 includes pixel array 208, parallax barrier 104 includes barrier element array 210 and lenticular lens 2502 includes a sub-lens array 2504. Barrier element array 210 is an example of light manipulator elements 1916a, and sub-lens array 2504 is an example of light manipulator elements 1916b. Furthermore, as shown in FIG. 25, display controller 1902 includes pixel array controller 1904 and light manipulator controller 1906. Light manipulator controller 1906 includes blocking array controller 206 coupled to barrier element array 210 and a lenticular lens controller 2506 coupled to sub-lens array 2504. These features of system 2500 are described as follows.

As described above, pixel array 208 includes a two-dimensional array of pixels, with each pixel of pixel array 208 configured to emit light included in light 108. Parallax barrier 104 is positioned proximate to a surface of pixel array 208. Barrier element array 210 includes a plurality of barrier elements arranged in an array. Barrier elements of barrier element array 210 may be configured to be selectively blocking or non-blocking (e.g., to form non-blocking slits, etc.), as described above for barrier element array 210 of FIG. 2, to deliver three-dimensional views.

Figure 26A:
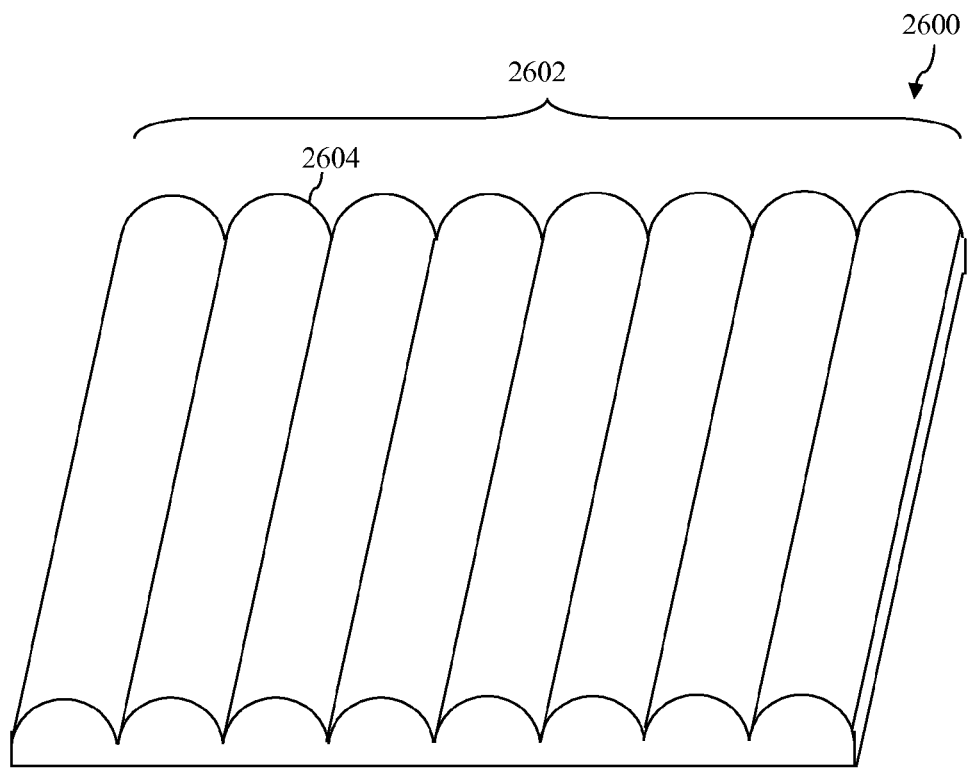
FIGS. 26A and 26B show views of a lenticular lens, according to an example embodiment.
Figure 26B:
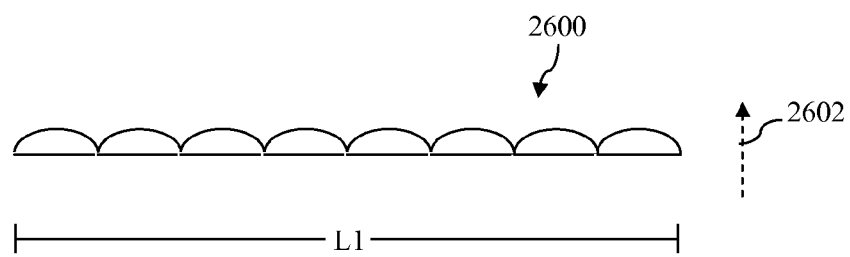

Lenticular lens 2502 is positioned proximate to a surface of parallax barrier 104. Sub-lens array 2504 of lenticular lens 2502 includes a plurality of sub-lenses to deliver three-dimensional views. For example, FIG. 26A shows a perspective view of a lenticular lens 2600 in accordance with an embodiment. Lenticular lens 2600 is an example of lenticular lens 2502 of FIG. 25. As shown in FIG. 26A, lenticular lens 2600 includes a sub-lens array 2602, which is an example of sub-lens array 2504 in FIG. 25. Sub-lens array 2602 includes a plurality of sub-lenses 2604 arranged in a two-dimensional array (e.g., arranged side-by-side in a row). Each sub-lens 2604 is shown in FIG. 26A as generally cylindrical in shape and having a substantially semi-circular cross-section, but in other embodiments may have other shapes. In FIG. 26A, sub-lens array 2602 is shown to include eight sub-lenses for illustrative purposes and is not intended to be limiting. For instance, sub-lens array 2602 may include any number (e.g., hundreds, thousands, etc.) of sub-lenses 2604. FIG. 26B shows a side view of lenticular lens 2600, oriented as lenticular lens 2600 may be positioned in system 2500 of FIG. 25 for lenticular lens 2502 to deliver three-dimensional views. In FIG. 26B, light may be passed through lenticular lens 2600 in the direction of dotted arrow 2502 to be diverted. Further description regarding using a lenticular lens to deliver three-dimensional views is provided in pending U.S. Ser. No. 12/774,307, titled "Display with Elastic Light Manipulator," which is incorporated by reference herein in its entirety.

In FIG. 25, display controller 1902 is configured to generate control signals to enable display device 2512 to display spatially separated three-dimensional images 1910a-1910n to users in viewing space 106. For example, similarly to pixel array controller 204 described above, pixel array controller 1904 is configured to generate a control signal 214 that is received by pixel array 208. Blocking array controller 206 is configured to generate first control signal 216, which is received by barrier element array 210, to cause the barrier elements of barrier element array 210 to be non-blocking or blocking. Lenticular lens controller 2506 may be present when lenticular lens 2502 is configured to be modifiable or adaptable. For example, in an embodiment, lenticular lens 2502 may be made of an elastic material (e.g., an elastic polymer, etc.). Second control signal 2508 may be generated by lenticular lens controller 2506, and received by lenticular lens 2502, to cause lenticular lens 2502 to be modified (e.g., stretched, compressed, etc.) to modify the light delivery characteristics of lenticular lens 2502. For example, second control signal 2508 may control a motor (e.g., a stepper motor) configured to stretch/compress lenticular lens 2502. Referring to FIG. 26B, lenticular lens 2600 may be configured to be stretched and/or compressed to modify a length L1 of lenticular lens 2600, for instance.

As such, barrier element array 210 filters light 108 to generate filtered light 110, and sub-lens array 2504 diverts filtered light 110 to generate filtered light 1908 that includes one or more three-dimensional images 1910 that may be viewed by users in viewing space 106. System 2500 may generate three-dimensional images 1910 in a similar manner as illustrated above with reference to FIGS. 21 and 22, for example, such that sub-lenses of lenticular lens 2502 are used to deliver three-dimensional views in place of barrier elements of a second barrier element array. Three-dimensional images 1910 are spatially separated in viewing space 106 as dictated by the configurations of barrier element array 210 and sub-lens array 2504 relative to pixel array 208.

Figure 27:
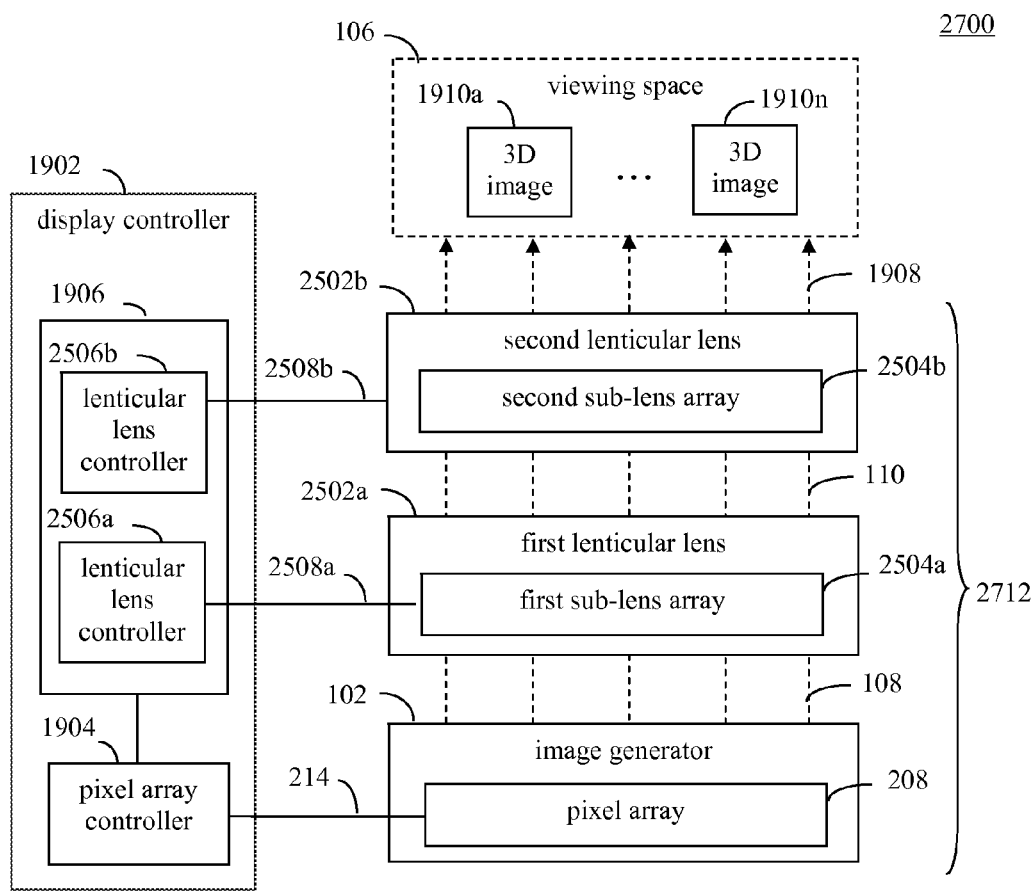
FIGS. 27-31 show block diagrams of display systems that are examples of the display system of FIG. 19, according to embodiments.

In another embodiment, system 1900 of FIG. 19 may include a pair of lenticular lenses used to deliver three-dimensional views. For instance, FIG. 27 shows a block diagram of a display system 2700, which is an example of system 1900 shown in FIG. 19, according to an embodiment. Display system 2700 is configured to display multiple three-dimensional images in a viewing space in a spatially separated manner. As shown in FIG. 27, system 2700 includes display controller 1902 and a display device 2712. Display device 2712 includes image generator 102, a first lenticular lens 2502a, and a second lenticular lens 2502b. First lenticular lens 2502a is an example of first light manipulator 1904a, and second lenticular lens 2502b is an example of second light manipulator 1904b. As shown in FIG. 27, image generator 102 includes pixel array 208, first lenticular lens 2502a includes first sub-lens array 2504a and second lenticular lens 2502b includes second sub-lens array 2504b. First sub-lens array 2504a is an example of light manipulator elements 1916a, and second sub-lens array 2504b is an example of light manipulator elements 1916b. Furthermore, as shown in FIG. 27, display controller 1902 includes pixel array controller 1904 and light manipulator controller 1906. Light manipulator controller 1906 includes a first lenticular lens controller 2506a coupled to first sub-lens array 2504a and a second lenticular lens controller 2506b coupled to second sub-lens array 2504b. These features of system 2700 are described as follows.

As described above, pixel array 208 includes a two-dimensional array of pixels, with each pixel of pixel array 208 configured to emit light included in light 108. First lenticular lens 2502a is positioned proximate to a surface of pixel array 208. First sub-lens array 2504a includes sub-lenses arranged in a two-dimensional array. In an embodiment, first sub-lens array 2504a may be stretched according to control signal 2508a to modify light delivery characteristics. In another embodiment, first sub-lens array 2504a may be fixed in shape/size (e.g., is not stretchable to modify light delivery characteristics).

Second lenticular lens 2502b is positioned proximate to a surface of first lenticular lens 2502b. Second sub-lens array 2504b of second lenticular lens 2502b includes a plurality of sub-lenses to deliver three-dimensional views. In an embodiment, second sub-lens array 2504b may be stretched according to control signal 2508b to modify light delivery characteristics. In another embodiment, second sub-lens array 2504b may be fixed in shape/size (e.g., is not stretchable to modify view delivery).

Display controller 1902 is configured to generate control signals to enable display device 2712 to display spatially separated three-dimensional images 1910a-1910n to users in viewing space 106. For example, similarly to pixel array controller 204 described above, pixel array controller 1904 is configured to generate a control signal 214 that is received by pixel array 208 to cause pixel array 208 to emit light 108. First sub-lens array 2504a diverts light 108 to generate diverted light 110, and second sub-lens array 2504b diverts diverted light 110 to generate diverted light 1908 that includes one or more three-dimensional images 1910 that may be viewed by users in viewing space 106. System 2700 may generate three-dimensional images 1910 in a similar manner as described above with reference to FIGS. 21 and 22, for example, such that sub-lenses of lenticular lens 2502a and 2502b are used to perform delivery of three-dimensional views rather than barrier elements. Three-dimensional images 1910 are spatially separated in viewing space 106 as dictated by the configurations of first and second sub-lens arrays 2504a and 2504b relative to pixel array 208.

Figure 28:
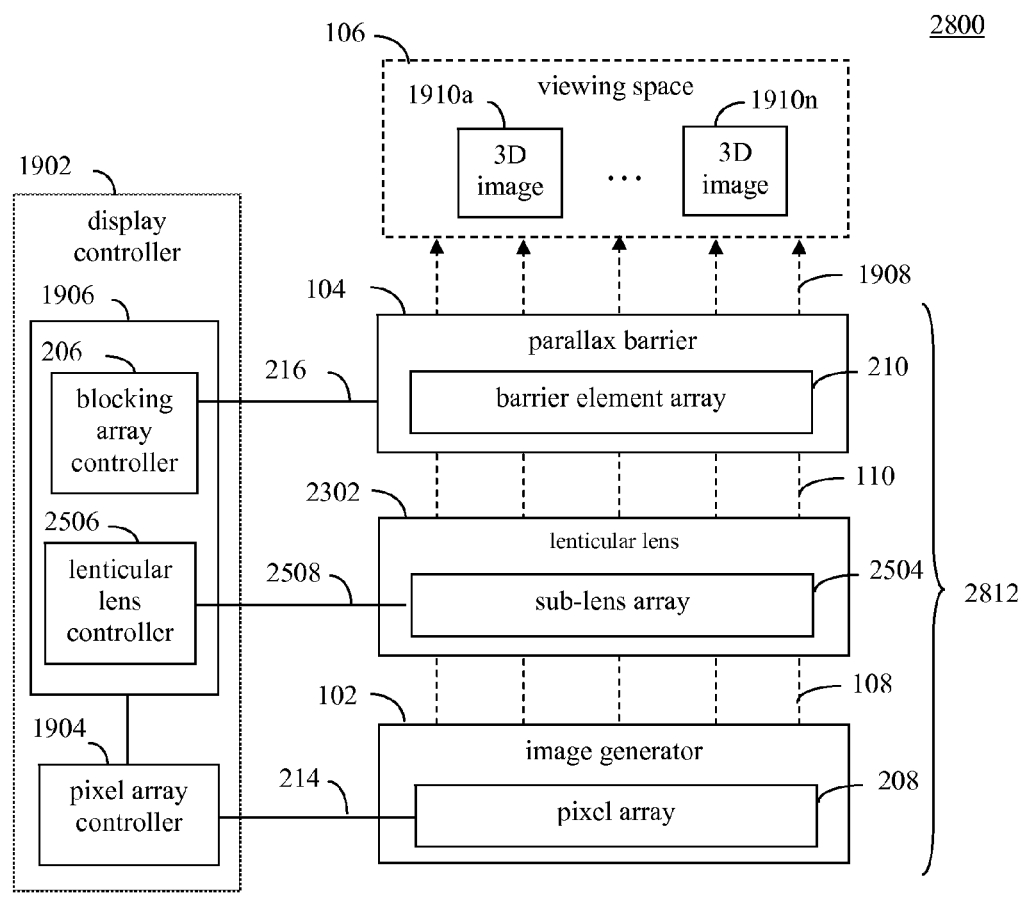

Furthermore, in another embodiment, system 1900 of FIG. 19 may include a lenticular lens and a parallax barrier that are exchanged in position relative to their positions in FIG. 25 to perform delivery of three-dimensional views. For instance, FIG. 28 shows a block diagram of a display system 2800, which is an example of system 1900 shown in FIG. 19, according to an embodiment. Display system 2800 is configured to display multiple three-dimensional images in a viewing space in a spatially separated manner. As shown in FIG. 28, system 2800 includes display controller 1902 and a display device 2812. Display device 2812 includes image generator 102, lenticular lens 2502, and parallax barrier 104. Lenticular lens 2502 is an example of first light manipulator 1904a, and parallax barrier 104 is an example of second light manipulator 1904b. As shown in FIG. 28, image generator 102 includes pixel array 208, lenticular lens 2502 includes sub-lens array 2504, and parallax barrier 104 includes barrier element array 210. Sub-lens array 2504 is an example of light manipulator elements 1916a, and barrier element array 210 is an example of light manipulator elements 1916b. Furthermore, as shown in FIG. 28, display controller 1902 includes pixel array controller 1904 and light manipulator controller 1906. Light manipulator controller 1906 includes lenticular lens controller 2506 coupled to sub-lens array 2504 and blocking array controller 206 coupled to barrier element array 210.

As described above, pixel array 208 includes a two-dimensional array of pixels, with each pixel of pixel array 208 configured to emit light included in light 108. Lenticular lens 2502 is positioned proximate to a surface of pixel array 208. Sub-lens array 2504 includes sub-lenses arranged in a two-dimensional array. In an embodiment, sub-lens array 2504 may be stretched according to control signal 2508 to modify view delivery characteristics. In another embodiment, sub-lens array 2504 may be fixed in shape/size (e.g., is not stretchable to modify view delivery).

Parallax barrier 104 is positioned proximate to a surface of lenticular lens 2502. Barrier element array 210 of parallax barrier 104 includes a plurality of barrier elements arranged in an array. Barrier elements of barrier element array 210 may be configured to be selectively blocking or non-blocking (e.g., to form non-blocking slits, etc.), as described above for barrier element array 210 of FIG. 2, to perform delivery of three-dimensional views.

Display controller 1902 is configured to generate control signals to enable display device 2812 to display spatially separated three-dimensional images 1910a-1910n to users in viewing space 106. For example, similarly to pixel array controller 204 described above, pixel array controller 1904 is configured to generate a control signal 214 that is received by pixel array 208 to cause pixel array 208 to emit light 108. Sub-lens array 2504 diverts light 108 to generate diverted light 110, and barrier element array 210 filters diverted light 110 to generate filtered light 1908 that includes one or more three-dimensional images 1910 that may be viewed by users in viewing space 106. System 2800 may generate three-dimensional images 1910 in a similar manner as described above with reference to FIGS. 21 and 22, for example, such that sub-lenses of lenticular lens 2502 are used to perform delivery of three-dimensional views in place of barrier elements (of a first barrier element array). Three-dimensional images 1910 are spatially separated in viewing space 106 as dictated by the configurations of sub-lens array 2504 and barrier element array 210 relative to pixel array 208.

Furthermore, in embodiments, blocking region array 210 may be turned off (barrier elements transition to the non-blocking state) such display devices 2512 and 2812 may provide three-dimensional views using sub-lens array 2504.

3. Example Light Manipulator Embodiments Including Fixed Parallax Barriers

Figure 29:
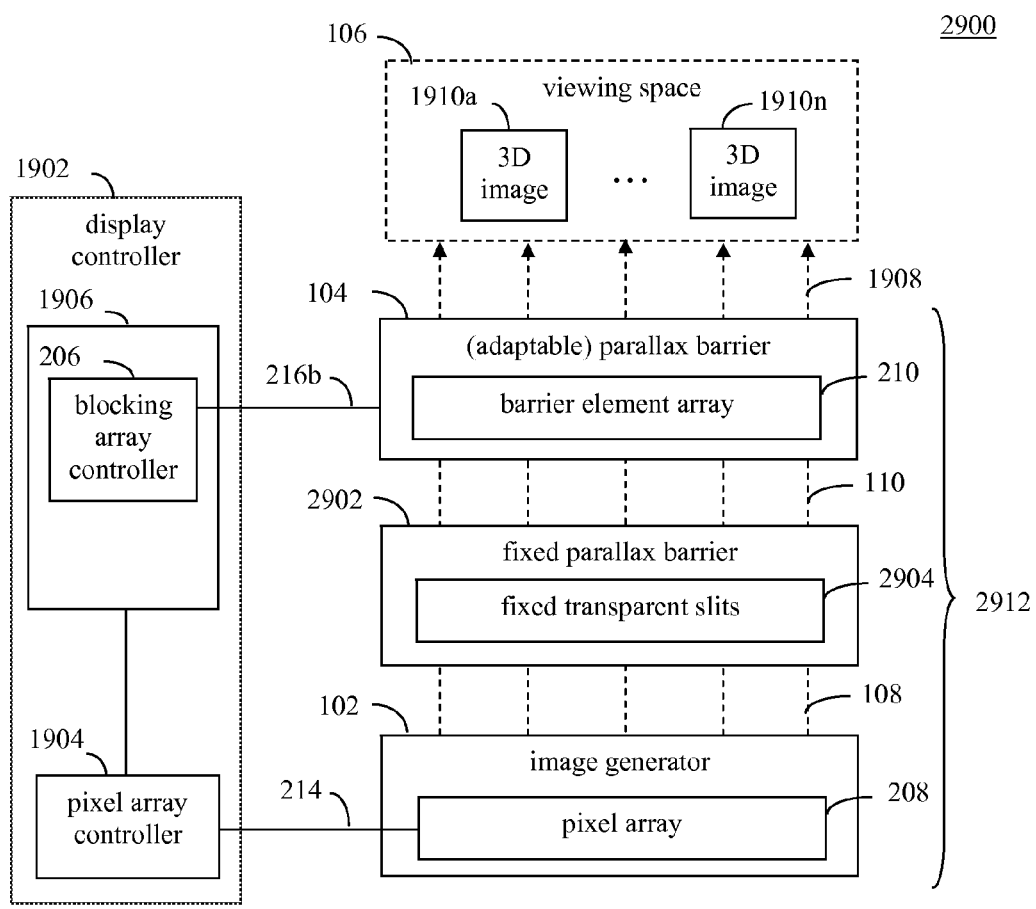

In an embodiment, system 1900 of FIG. 19 may include a fixed parallax barrier as a light manipulator together with an adaptable parallax barrier to deliver three-dimensional images and/or two-dimensional images. For instance, FIG. 29 shows a block diagram of a display system 2900, which is an example of system 1900 shown in FIG. 19, according to an embodiment. Display system 2900 is configured to display multiple three-dimensional images in a viewing space in a spatially separated manner. As shown in FIG. 29, system 2900 includes display controller 1902 and a display device 2912. Display device 2912 includes image generator 102, a fixed parallax barrier 2902, and an adaptable parallax barrier 104. Fixed parallax barrier 2902 is an example of first light manipulator 1904a, and adaptable parallax barrier 104 is an example of second light manipulator 1904b. As shown in FIG. 29, image generator 102 includes pixel array 208, fixed parallax barrier 2902 includes fixed transparent slits 2904, and adaptable parallax barrier 104 includes a barrier element array 210. Fixed transparent slits 2904 is an example of light manipulator elements 1916a, and barrier element array 210 is an example of light manipulator elements 1916b. Furthermore, as shown in FIG. 29, display controller 1902 includes pixel array controller 1904 and light manipulator controller 1906. Light manipulator controller 1906 includes blocking array controller 206 coupled to barrier element array 210. These features of system 2900 are described as follows.

As described above, pixel array 208 includes a two-dimensional array of pixels, with each pixel of pixel array 208 configured to emit light included in light 108. Fixed parallax barrier 2902 is positioned proximate to a surface of pixel array 208. Adaptable parallax barrier 104 is positioned proximate to a surface of fixed parallax barrier 2902. Fixed parallax barrier 2902 is not adaptable. Fixed parallax barrier 2902 includes fixed transparent slits 2904, which is a fixed arrangement of transparent slits in a material of fixed parallax barrier 2902 that has a number and spacing of transparent slits selected for a particular application of display device 2912. Fixed transparent slits 2904 may include any number of slits, including hundreds or thousands of slits, which may be arranged in any manner, including having lengths that are equal to or less than a length of fixed parallax barrier 2902. Fixed transparent slits 2904 may have uniform dimensions and distributions, or different regions of fixed transparent slits 2904 may have dimensions and/or distributions that are different from other regions of fixed transparent slits 2904. Barrier element array 210 is adaptable, as described elsewhere herein. Barrier element array 210 includes a plurality of barrier elements arranged in an array. Barrier elements of barrier element array 210 may be configured to be selectively blocking or non-blocking, as described above for barrier element array 210 of FIG. 2.

Display controller 1902 is configured to generate control signals to enable display device 1912 to display spatially separated three-dimensional images 1910a-1910n to users in viewing space 106. For example, similarly to pixel array controller 204 described above, pixel array controller 1904 is configured to generate a control signal 214 that is received by pixel array 208. Control signal 214 may include one or more control signals used to cause pixels of pixel array 208 to emit light 108 of particular desired colors and/or intensity. Similarly to blocking array controller 206 described above, light manipulator controller 1906 is configured to generate control signals, including a control signal 216. Control signal 216 is received by barrier element array 210. Control signal 216 may include one or more control signals used to cause the barrier elements of barrier element array 210 to be non-blocking or blocking. Because fixed transparent slits 2904 of fixed parallax barrier 2902 are fixed, fixed parallax barrier 2902 does not receive a control signal with regard to fixed transparent slits 2904. Display device 2912 generates spatially separated three-dimensional views in a similar manner as display device 2012 in FIG. 20, except that fixed parallax barrier 2902 is not adaptable. Fixed transparent slits 2904 filter light 108 according to their fixed configuration to generate filtered light 110, and barrier element array 210 filters filtered light 110 to generate filtered light 1908 that includes one or more three-dimensional images 1910 that may be viewed by users in viewing space 106. Three-dimensional images 1910 are spatially separated in viewing space 106 as dictated by the configurations of fixed transparent slits 2904 and barrier element array 210 relative to pixel array 208.

In a similar manner to the configuration of FIG. 29, in another embodiment, adaptable parallax barrier 104 may be a fixed parallax barrier having fixed transparent slits, and fixed parallax barrier 2902 may be an adaptable parallax barrier having an adaptable barrier element array, to deliver spatially separated three-dimensional views to viewers.

4. Example Light Manipulator Embodiments Including Fixed Parallax Barriers

In an embodiment, system 1900 of FIG. 19 may be configured similarly to display system 220 of FIG. 2B to deliver three-dimensional images and/or two-dimensional images. For instance, in embodiments, system 1900 may include backlighting 116 and pixel array 222 separated by one or both of first and second light manipulators 1914a and 1914b.

Figure 30:
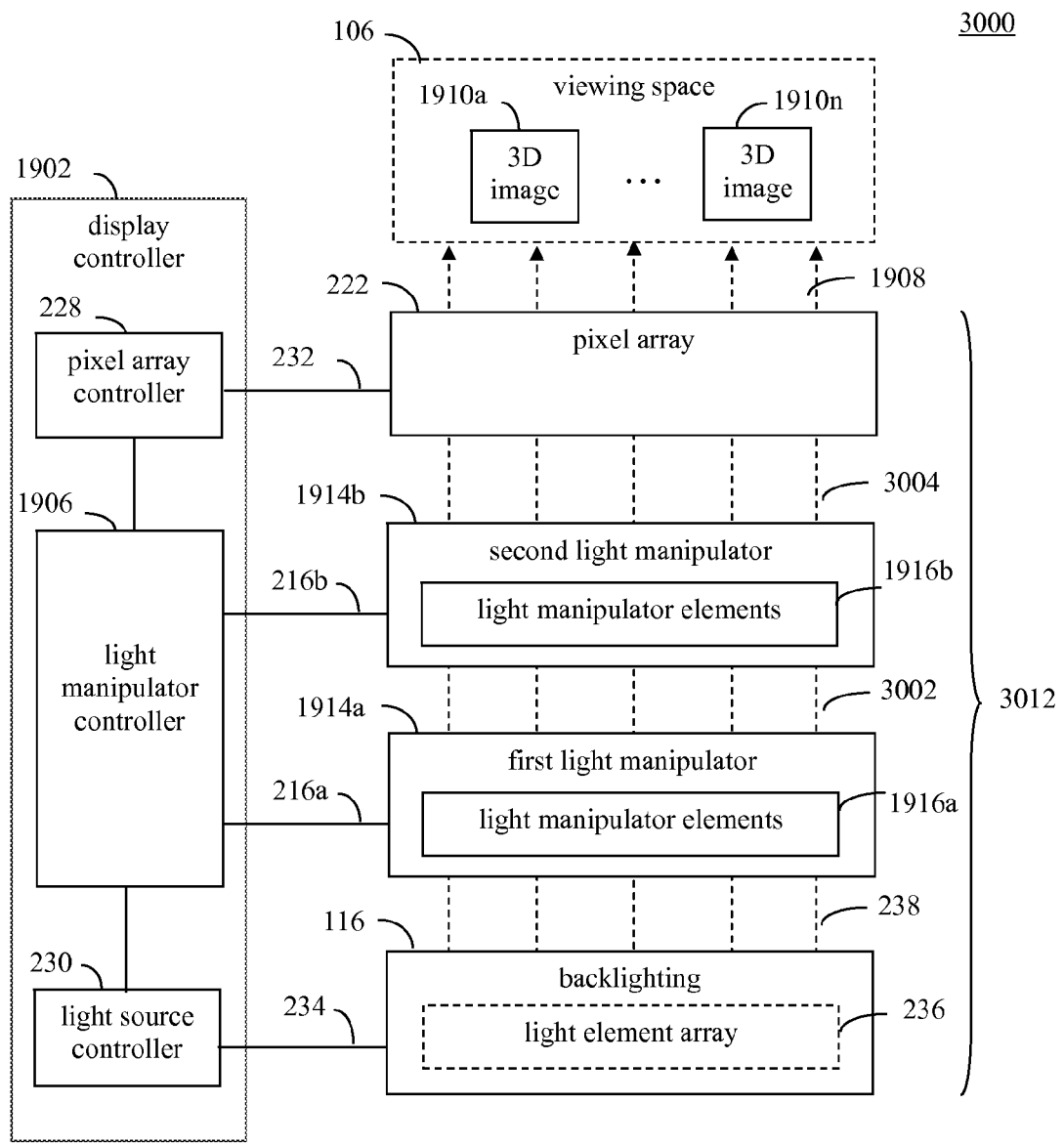

FIG. 30 shows a block diagram of a display system 3000, which is an example of system 1900 shown in FIG. 19, according to an embodiment. Display system 3000 is configured to display multiple three-dimensional images in a viewing space in a spatially separated manner. As shown in FIG. 30, system 3000 includes display controller 1902 and a display device 3012. Display device 3012 includes backlighting 116, first light manipulator 1904a, second light manipulator 1904b, and pixel array 222. As shown in FIG. 30, backlighting 116 optionally includes light element array 236, first light manipulator 1914a includes first light manipulator elements 1916a, and second light manipulator 1914b includes second light manipulator elements 1916b. Furthermore, as shown in FIG. 30, display controller 1902 includes light source controller 230, light manipulator controller 1906, and pixel array controller 228. These features of system 3000 are described as follows.

As described above, backlighting 116 emits light 238. First light manipulator 1914a is positioned proximate to a surface of backlighting 116. Second light manipulator 1914b is positioned proximate to a surface of first light manipulator 1914a. First light manipulator elements 1916a are a layer of first light manipulator 1914a, and second light manipulator elements 1916b are a layer of second light manipulator 1914b. First light manipulator elements 1916a manipulate light 238 to generate manipulated light 3002. Second light manipulator elements 1916b manipulate light 3002 to generate manipulated light 3004. Pixel array 208 is positioned proximate to a surface of second light manipulator 1914b. Pixel array 208 includes a two-dimensional array of pixels configured to filter light 3004 to impose images on light 3004, to generate filtered light 1908.

Display controller 1902 is configured to generate control signals to enable display device 3012 to display spatially separated three-dimensional images 1910a-1910n to users in viewing space 106. As described above, light source controller 230 generates a control signal 234 that is received by light element array 236. Control signal 234 may include one or more control signals used to control the amount of light emitted by each light source in light element array 236 to generate light 238. Light manipulator controller 1906 is configured to generate control signals, including a first control signal 216a received by first light manipulator elements 1916a and a second control signal 216b received by second light manipulator elements 1916b. First control signal 216a may include one or more control signals used to cause first light manipulator elements 1916a to manipulate light 238 as desired, to generate manipulated light 3002. Second control signal 216b may include one or more control signals used to cause second light manipulator elements 1916b to manipulate light 3002 as desired, to generate manipulated light 3004. As described above, pixel array controller 228 is configured to generate a control signal 232 that is received by pixel array 222. Control signal 232 may include one or more control signals used to cause pixels of pixel array 222 to impose desired images (e.g., colors, grayscale, etc.) on light 3004 as it passes through pixel array 222. In this manner, pixel array 222 generates filtered light 1908 that includes one or more two-dimensional and/or three-dimensional images 1910 that may be viewed by users in viewing space 106. Three-dimensional images 1910 are spatially separated in viewing space 106 as dictated by the configurations of first and second light manipulator elements 1916a and 1916b relative to pixel array 222.

Figure 31:
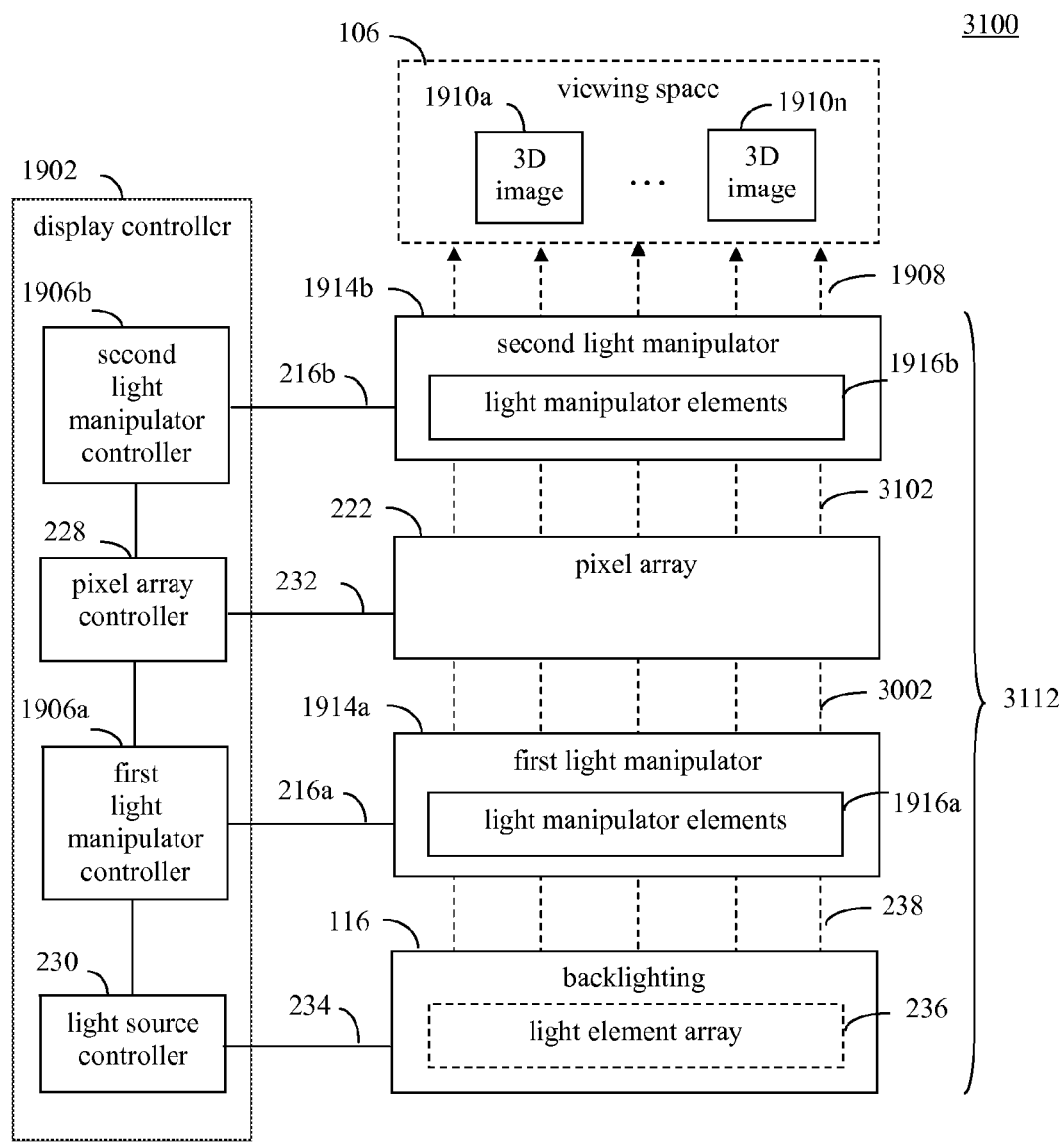

FIG. 31 shows a block diagram of a display system 3100, which is another example of system 1900 shown in FIG. 19, according to an embodiment. Display system 3100 is configured to display multiple three-dimensional images in a viewing space in a spatially separated manner. As shown in FIG. 31, system 3100 includes display controller 1902 and a display device 3112. Display device 3112 includes backlighting 116, first light manipulator 1904a, pixel array 222, and second light manipulator 1904b. As shown in FIG. 31, backlighting 116 optionally includes light element array 236, first light manipulator 1914a includes first light manipulator elements 1916a, and second light manipulator 1914b includes second light manipulator elements 1916b. Furthermore, as shown in FIG. 31, display controller 1902 includes light source controller 230, a first light manipulator controller 1906a, pixel array controller 228, and a second light manipulator controller 1906b. These features of system 3100 are described as follows.

As described above, backlighting 116 emits light 238. First light manipulator 1914a is positioned proximate to a surface of backlighting 116. Pixel array 208 is positioned proximate to a surface of first light manipulator 1914a. Second light manipulator 1914b is positioned proximate to a surface of pixel array 222. First light manipulator elements 1916a are a layer of first light manipulator 1914a, and second light manipulator elements 1916b are a layer of second light manipulator 1914b. First light manipulator elements 1916a manipulate light 238 to generate manipulated light 3102. Pixel array 208 includes a two-dimensional array of pixels configured to filter light 3102 to impose images on light 3102, to generate filtered light 3102. Second light manipulator elements 1916b manipulate light 3102 to generate light 1908.

Display controller 1902 is configured to generate control signals to enable display device 3112 to display spatially separated three-dimensional images 1910a-1910n to users in viewing space 106. As described above, light source controller 230 generates a control signal 234 that is received by light element array 236. Control signal 234 may include one or more control signals used to control the amount of light emitted by each light source in light element array 236 to generate light 238. Light manipulator controller 1906a is configured to generate a first control signal 216a received by first light manipulator elements 1916a. First control signal 216a may include one or more control signals used to cause first light manipulator elements 1916a to manipulate light 238 as desired, to generate manipulated light 3102. As described above, pixel array controller 228 is configured to generate a control signal 232 that is received by pixel array 222. Control signal 232 may include one or more control signals used to cause pixels of pixel array 222 to impose desired images (e.g., colors, grayscale, etc.) on light 3002 as it passes through pixel array 222. Light manipulator controller 1906b is configured to generate a second control signal 216b received by second light manipulator elements 1916b. Second control signal 216b may include one or more control signals used to cause second light manipulator elements 1916b to manipulate light 3102 as desired, to generate light 1908. In this manner, light 1908 is generated that includes one or more two-dimensional and/or three-dimensional images 1910 that may be viewed by users in viewing space 106. Three-dimensional images 1910 are spatially separated in viewing space 106 as dictated by the configurations of first and second light manipulator elements 1916a and 1916b relative to pixel array 222.

D. Example Display Environments

As described above, parallax barriers (e.g., parallax barrier 104) and light manipulators (e.g., first and second light manipulators 1914a and 1914b) may be reconfigured to change the locations of delivered views based on changing viewer positions. As such, a position of a viewer may be determined/tracked so that a parallax barrier and/or light manipulator may be reconfigured to deliver views consistent with the changing position of the viewer. For instance, with regard to a parallax barrier, a spacing, number, arrangement, and/or other characteristic of slits may be adapted according to the changing viewer position. With regard to a lenticular lens, a size of the lenticular lens may be adapted (e.g., stretched, compressed) according to the changing viewer position. In embodiments, a position of a viewer may be determined/tracked by determining a position of the viewer directly, or by determining a position of a device associated with the viewer (e.g., a device worn by the viewer, held by the viewer, sitting in the viewer's lap, in the viewer's pocket, sitting next the viewer, etc.).

Figure 32:
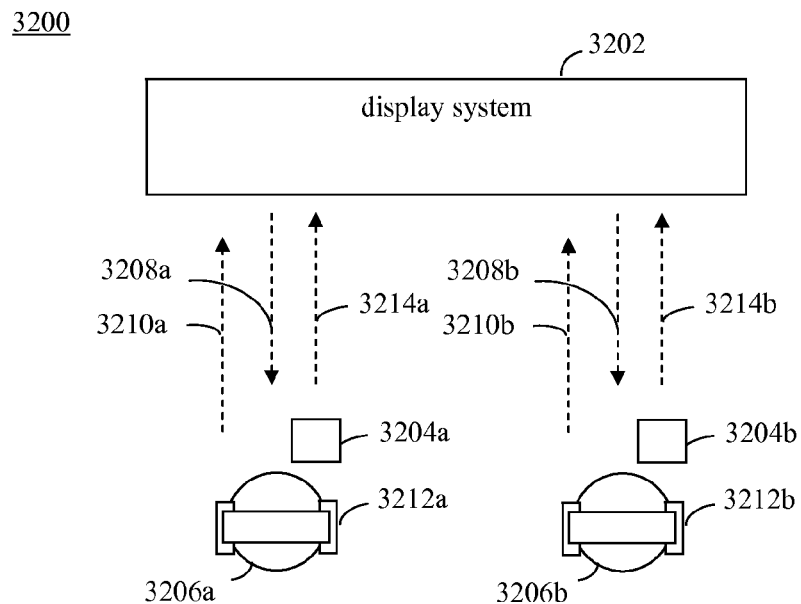
FIG. 32 shows a block diagram of a display environment, according to an example embodiment.

For instance, FIG. 32 shows a block diagram of a display environment 3200, according to an example embodiment. In the example of FIG. 32, first and second viewers 3206a and 3206b are present in display environment 3200, and are enabled to interact with a display device 3202 to be delivered two-dimensional and/or three-dimensional media content. Although two viewers 3206 are shown present in FIG. 32, in other embodiments, other numbers of viewers 3206 may be present in display environment 3200 that may interact with display device 3202 and may be delivered media content by display device 3202. As shown in FIG. 32, display environment 3200 includes display device 3202, a first remote control 3204a, a second remote control 3204b, a first headset 3212a, a second headset 3212b, and viewers 3206a and 3206b. Display device 3202 is an example of display system 112 of FIG. 1, and may be configured similarly to any display device described herein, including display device 250 (FIG. 2A), display device 260 (FIG. 2B), display device 1900 (FIG. 19), etc. Viewer 3206a is delivered a view 3208a by display device 3202, and viewer 3206b is delivered a view 3208b by display device 3202. Views 3208a and 3208b may each be a two-dimensional view or a three dimensional view. Furthermore, in embodiments, view 3208a may be delivered to viewer 3206a, but not be visible by viewer 3206b, and view 3208b may be delivered to viewer 3206b, but not be visible by viewer 3206a.

Remote control 3204a is a device that viewer 3206a may use to interact with display device 3202, and remote control 3204b is a device that viewer 3206b may use to interact with display device 3202. For example, as shown in FIG. 32, viewer 3206a may interact with a user interface of remote control 3204a to generate a display control signal 3214a, and viewer 3206b may interact with a user interface of remote control 3204b to generate a display control signal 3214b. Display control signals 3214a and 3214b may be transmitted to display device 3202 using wireless or wired communication links. Display control signals 3214a and 3214b may be configured to select particular content desired to be viewed by viewers 3206a and 3206b, respectively. For example, display control signals 3214a and 3214b may select particular media content to be viewed (e.g., television channels, video games, DVD (digital video discs) content, video tape content, web content, etc.). Display control signals 3214a and 3214b may select whether such media content is desired to be viewed in two-dimensional or three-dimensional form by viewers 3206a and 3206b, respectively. Remote controls 3204a and 3204b may be television remote control devices, game controllers, smart phones, or other remote control type device.

Headsets 3212a and 3212b are worn by viewers 3206a and 3206b, respectively. Headsets 3212a and 3212b each include one or two speakers (e.g., earphones) that enable viewers 3206a and 3206b to hear audio associated with the media content of views 3208a and 3208b. Headsets 3212a and 3212b enable viewers 3206a and 3206b to hear audio of their respective media content without hearing audio associated the media content of the other of viewers 3206a and 3206b. Headsets 3212a and 3212b may each optionally include a microphone to enable viewers 3206a and 3206b to interact with display device 3202 using voice commands.

Display device 3202a, headset 3212a, and/or remote control 3204a may operate to provide position information 3210a regarding viewers 3206a to display device 3202, and display device 3202b, headset 3212b, and/or remote control 3204b may operate to provide position information 3210b regarding viewers 3206b to display device 3202. Display device 3202 may use position information 3210a and 3210b to reconfigure one or more light manipulators (e.g., parallax barriers and/or lenticular lenses) of display device 3202 to enable views 3208a and 3208b to be delivered to viewers 3206a and 3206b, respectively, at various locations. For example, display device 3202a, headset 3212a, and/or remote control 3204a may use positioning techniques to track the position of viewer 3206a, and display device 3202b, headset 3212b, and/or remote control 3204b may use positioning techniques to track the position of viewer 3206b.

Figure 33:
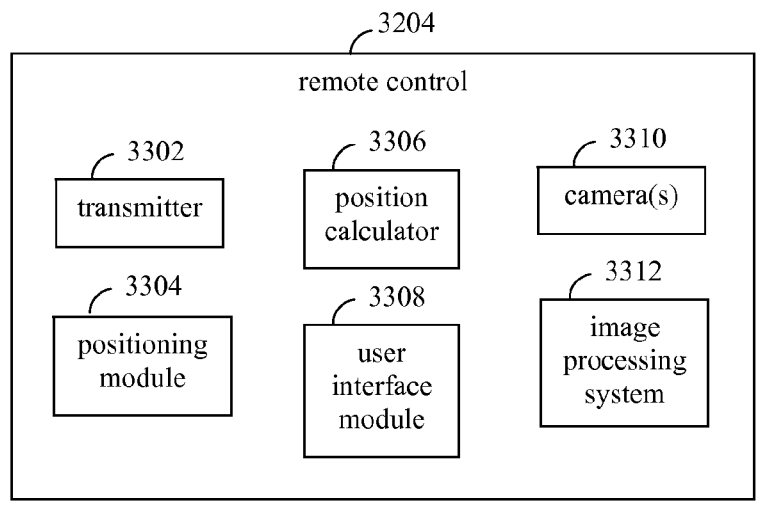
FIG. 33 shows a block diagram of a remote device, according to an example embodiment.

Remote controls 3204a and 3204b may be configured in various ways to enable interaction with display device 3202 and to enable the position of viewers 3206a and 3206b, respectively, to be tracked. For instance, FIG. 33 shows a block diagram of a remote control 3204, according to an example embodiment. One or both of remote controls 3204a and 3204b may be configured similarly to remote control 3204 of FIG. 33. As shown in FIG. 33, remote control 3204 may include a transmitter 3302, a positioning module 3304, a position calculator 3306, a user interface module 3308, one or more camera(s) 3310, and an image processing system 3312. Remote control 3204 may include one or more of these elements shown in FIG. 33, depending on the particular embodiment. These elements of remote control 3204 are described as follows.

Positioning module 3304 may be included in remote control 3204 to determine a position of remote control 3204 according to a positioning technique, such triangulation or trilateration. For instance, positioning module 3304 may include one or more receivers that receive satellite broadcast signals (e.g., a global positioning system (GPS) module that receives signals from GPS satellites). Position calculator 3306 may calculate the position of remote control 3204 by precisely timing the received signals according to GPS techniques. In another embodiment, positioning module 3304 may include one or more receivers that receive signals transmitted by display device 3202 that are used by position calculator 3306 to calculate the position of remote control 3204. In other embodiments, positioning module 3304 and position calculator 3306 may implement other types of positioning techniques. By determining a position of remote control 3204, a position of the associated viewer 3206 may be estimated.

User interface module 3308 may be present to enable viewer 3206 to interact with remote control 3204. For example, user interface module 3308 may include any number and combination of user interface elements, such as a keyboard, a thumb wheel, a pointing device, a roller ball, a stick pointer, a joystick, a thumb pad, a display, a touch sensitive display, any number of virtual interface elements, a voice recognition system, a haptic interface, and/or other user interface elements described elsewhere herein or otherwise known. User interface 3308 may enable the corresponding viewer 3206 to select media content to be delivered by display system 3202, including the selecting of a television channel, a video game, DVD (digital video discs) content, video tape content, web content, etc. User interface module 3308 may further be configured to enable viewer 3206 to manually enter position information for viewer 3206 into remote control 3204, including manually entering coordinates of viewer 3206 in viewing space 106, entering an indication of a predetermined location in viewing space 106 into remote control 3204 (e.g., a "location A", a "seat D," etc.), or providing position information in any other manner.

Camera(s) 3310 may be present in remote control 3204 to enable optical position detection of the corresponding viewer 3206. For example, camera(s) 3310 may be pointed by the corresponding viewer 3206 at display device 3202, which may display a symbol or code, and one or more images of the displayed symbol or code may be captured by camera(s) 3310. Image processing system 3312 may receive the captured image(s), and determine a position of remote control 3204 relative to display device 3202 based on the captured image(s). For example, in an embodiment, camera(s) 3310 may include a pair of cameras, and image processing system 3312 may perform dual image processing to determine the position of remote control 3204 relative to display device 3202.

Transmitter 3302 is configured to transmit position information 3210 and/or selected media content information to display device 3202 from remote control 3204. Position information 3210 may include a determined position for remote control 3204 (e.g., calculated by position calculator 3306 or image processing system 3312), and/or may include captured data (e.g., received signal data received by positioning module 3304, images captured by camera(s) 3310, etc.) so that display device 3202 may determine the position of remote control 3204 based on the captured data.

Figure 34:
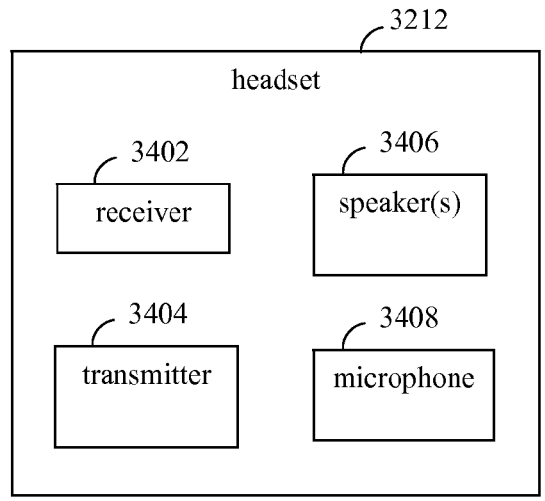
FIG. 34 shows a block diagram of a headset, according to an example embodiment.

Headsets 3212a and 3212b may be configured in various ways to enable interaction with display device 3202, to enable receiving of corresponding audio, and to enable the position of viewers 3206a and 3206b, respectively, to be tracked. For instance, FIG. 34 shows a block diagram of a headset 3212, according to an example embodiment. One or both of headset 3212a and 3212b may be configured similarly to headset 3212 of FIG. 34. As shown in FIG. 34, headset 3212 may include a receiver 3402, a transmitter 3404, one or more speakers 3406, and a microphone 3408. Headset 3212 may include one or more of these elements shown in FIG. 34, depending on the particular embodiment. These elements of headset 3212 are described as follows. Although not shown in FIG. 34, headset 3212 may include positioning module 3304, position calculator 3306, one or more camera(s) 3310, and/or image processing system 3312 to be used to determine a position of the corresponding viewer 3206 in a similar manner as described above for remote control 3204.

Receiver 3402 may be configured to receive audio information associated with the corresponding view 3208 delivered by display system 3202, to be played to the corresponding viewer 3206 by speaker(s) 3406. Speaker(s) 3406 may include one or more speakers for playing audio to the corresponding viewer 3206 wearing headset 3212. For instance, speaker(s) 3406 may include a single speaker (for one ear of viewer 3206) or a pair of speakers (for both ears of viewer 3206).

Transmitter 3404, when present, may be configured to transmit position information 3210 (e.g., determined in headset 3212 in a similar manner as described above for remote control 3204) to display device 3202 from headset 3212. In addition, transmitter 3404 may be configured to transmit media content selections made by voice interaction with microphone 3048 to display device 3202 from headset 3212. Still further, in an embodiment, headset 3212 may provide telephone (e.g., cell phone) functionality for viewer 3212. In such an embodiment, microphone 3408 may receive voice input to a phone call from viewer 3212, speaker(s) 3406 may provide voice output (from remote callers) to viewer 3212 associated with the phone call, and receiver 3402 and transmitter 3404 may be configured to receive and transmit phone call signals.

Figure 35:
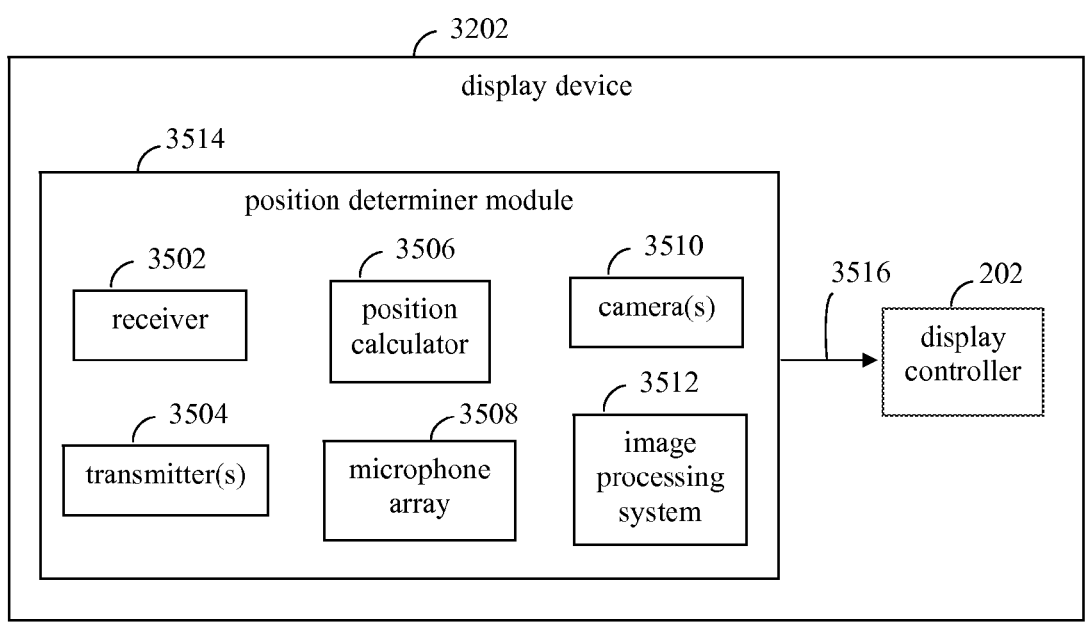
FIG. 35 shows a block diagram of a display device, according to an example embodiment.

Display device 3202 may have any form, such as any one or more of a display or monitor, a game console, a set top box, a stereo receiver, a computer, any other display device mentioned elsewhere herein or otherwise known, or any combination of such devices. Display device 3202 may be configured in various ways to enable the position of viewer 3206 to be tracked. For instance, FIG. 35 shows a block diagram of display device 3202, according to an example embodiment. As shown in FIG. 35, display device 3202 may include a position determiner module 3514 configured to determine a position of one or more viewers. Position determiner module 3514 may include a receiver 3502, one or more transmitter(s) 3504, a position calculator 3506, a microphone array 3508, one or more camera(s) 3510, and an image processing system 3312. Position determiner module 3514 may include one or more of these elements, depending on the particular embodiment. As shown in FIG. 35, position determiner module 3514 generates position information 3516 based on one or more of receiver 3502, transmitter(s) 3504, position calculator 3506, microphone array 3508, camera(s) 3510, and image processing system 3312. Position information 3516 may be received by display controller 202, and used by display controller 202 to adapt display device 3202 (e.g., adapting one or more of parallax barrier 104, pixel array 114, and/or backlighting 116 of FIG. 1, adapting one or more of first and second light manipulators 1914a and 1914b and/or image generator 102 of FIG. 19, etc., according to corresponding control signals) to deliver views to viewers 3206a and 3206b as viewer 3206a and/or viewer 3206b may reposition within a viewing space. These elements of display device 3202 are described as follows.

When present, microphone array 3508 includes one or more microphones that may be positioned in various microphone locations in and/or around display device 3202 to capture sounds (e.g., voice) from viewer 3206a and/or viewer 3206b. Microphone array 3508 produces signals representative of the received sounds, which may be received by position calculator 3506. Position calculator 3506 may be configured to use the received signals to determine the location of viewer 3206a and/or viewer 3206b. For example, position calculator 3506 may use voice recognition techniques to determine that the sounds are received from viewer 3206a and/or viewer 3206b, and may perform audio localization techniques to determine a position of viewer 3206a and/or viewer 3206b based on the sounds.

Camera(s) 3510 may be present in display device 3202 to enable optical position detection of viewer 3206a and/or viewer 3206b. For example, camera(s) 3510 may be pointed from display device 3202 to viewing space 106 to capture images of viewer 3206a and/or viewer 3206b and/or associated remote controls 3204a and/or 3204b and/or headsets 3212a and/or 3212b. Viewer 3206a and/or viewer 3206b, remote control 3204a and/or remote control 3204b, and/or headset 3212a and/or headset 3212b may optionally display a symbol or code, and the displayed symbol or code may be captured in the images. Image processing system 3512 may receive the captured image(s), and determine a position of viewer 3206a and/or viewer 3206b relative to display device 3202 based on the captured image(s) (e.g., using facial recognition, image processing of the symbol or code, etc.). For example, in an embodiment, camera(s) 3510 may include a pair of cameras, and image processing system 3512 may perform dual image processing to determine the position of viewer 3206a and/or viewer 3206b, remote control 3204a and/or remote control 3204b, and/or headset 3212a and/or headset 3212b relative to display device 3202.

When present, transmitter(s) may be configured to transmit signals that may be received by positioning module 3304 to determine a position of remote control 3204a, remote control 3204b, headset 3212a, and/or headset 3212b, as described above with respect to FIG. 33 and FIG. 34.

Receiver 3502 may be configured to receive position information 3210 from remote control 3204a, remote control 3204b, headset 3212a, and/or headset 3212b. As described above, position information 3210 may include a determined position for remote control 3204a, remote control 3204b, headset 3212a, and/or headset 3212b and/or may include captured data (e.g., received signal data, images, etc.). Display device 3202 may determine the position of remote control 3204a, remote control 3204b, headset 3212a, and/or headset 3212b based on the captured data. For example, position calculator 3306 may determine a position of remote control 3204a, remote control 3204b, headset 3212a, and/or headset 3212b based on the signal data received by positioning module 3304 at remote control 3204a, remote control 3204b, headset 3212a, and/or headset 3212b. Alternatively, image processing system 3312 may determine a position of remote control 3204a, remote control 3204b, headset 3212a, and/or headset 3212b based on the images captured by camera(s) 3310 at remote control 3204a, remote control 3204b, headset 3212a, and/or headset 3212b.

III. Example Display Controller Implementations

Display controller 202, pixel array controller 204, barrier array controller 206, pixel array controller 228, light source controller 230, slit spacing calculator 902, display controller 1902, pixel array controller 1904, light manipulator controller 1906, lenticular lens controller 2506, positioning module 3304, position calculator 3306, image processing system 3312, position determiner module 3514, position calculator 3506, and image processing system 3512 may be implemented in hardware, software, firmware, or any combination thereof. For example, display controller 202, pixel array controller 204, barrier array controller 206, pixel array controller 228, light source controller 230, slit spacing calculator 902, display controller 1902, pixel array controller 1904, light manipulator controller 1906, lenticular lens controller 2506, positioning module 3304, position calculator 3306, image processing system 3312, position determiner module 3514, position calculator 3506, and/or image processing system 3512 may be implemented as computer program code configured to be executed in one or more processors. Alternatively, display controller 202, pixel array controller 204, barrier array controller 206, pixel array controller 228, light source controller 230, slit spacing calculator 902, display controller 1902, pixel array controller 1904, light manipulator controller 1906, lenticular lens controller 2506, positioning module 3304, position calculator 3306, image processing system 3312, position determiner module 3514, position calculator 3506, and/or image processing system 3512 may be implemented as hardware logic/electrical circuitry.

Figure 36:
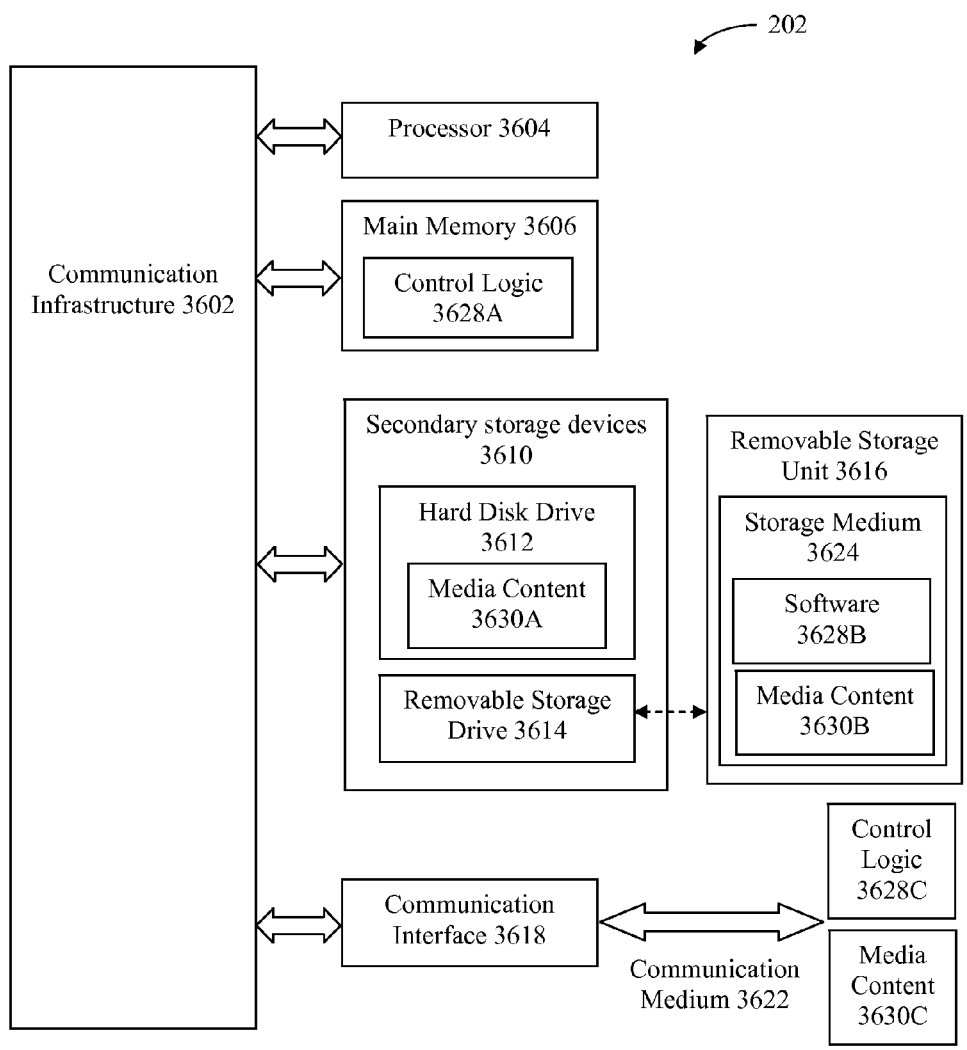
FIG. 36 shows a block diagram of an example display controller, according to an embodiment.

For instance, FIG. 36 shows a block diagram of an example implementation of display controller 202, according to an embodiment. In embodiments, display controller 202 may include one or more of the elements shown in FIG. 36. As shown in the example of FIG. 36, display controller 202 may include one or more processors (also called central processing units, or CPUs), such as a processor 3604. Processor 3604 is connected to a communication infrastructure 3602, such as a communication bus. In some embodiments, processor 3604 can simultaneously operate multiple computing threads.

Display controller 202 also includes a primary or main memory 3606, such as random access memory (RAM). Main memory 3606 has stored therein control logic 3628A (computer software), and data.

Display controller 202 also includes one or more secondary storage devices 3610. Secondary storage devices 3610 include, for example, a hard disk drive 3612 and/or a removable storage device or drive 3614, as well as other types of storage devices, such as memory cards and memory sticks. For instance, display controller 202 may include an industry standard interface, such a universal serial bus (USB) interface for interfacing with devices such as a memory stick. Removable storage drive 3614 represents a floppy disk drive, a magnetic tape drive, a compact disk drive, an optical storage device, tape backup, etc.

Removable storage drive 3614 interacts with a removable storage unit 3616. Removable storage unit 3616 includes a computer useable or readable storage medium 3624 having stored therein computer software 3628B (control logic) and/or data. Removable storage unit 3616 represents a floppy disk, magnetic tape, compact disk, DVD, optical storage disk, or any other computer data storage device. Removable storage drive 3614 reads from and/or writes to removable storage unit 3616 in a well known manner.

Display controller 202 further includes a communication or network interface 3618. Communication interface 3618 enables the display controller 202 to communicate with remote devices. For example, communication interface 3618 allows display controller 202 to communicate over communication networks or mediums 3642 (representing a form of a computer useable or readable medium), such as LANs, WANs, the Internet, etc. Network interface 3618 may interface with remote sites or networks via wired or wireless connections.

Control logic 3628C may be transmitted to and from display controller 202 via the communication medium 3642.

Any apparatus or manufacture comprising a computer useable or readable medium having control logic (software) stored therein is referred to herein as a computer program product or program storage device. This includes, but is not limited to, display controller 202, main memory 3606, secondary storage devices 3610, and removable storage unit 3616. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for display controller 202, pixel array controller 204, barrier array controller 206, pixel array controller 228, light source controller 230, slit spacing calculator 902, display controller 1902, pixel array controller 1904, light manipulator controller 1906, lenticular lens controller 2506, positioning module 3304, position calculator 3306, image processing system 3312, position determiner module 3514, position calculator 3506, image processing system 3512, flowchart 600, step 1202, step 1302, flowchart 1500, flowchart 1800 (including any one or more steps of flowcharts 600, 1500, and 1800), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

As described herein, display controller 202 may be implemented in association with a variety of types of display devices. Such display devices may be implemented in or in association with a variety of types of media devices, such as a stand-alone display (e.g., a television display such as flat panel display, etc.), a computer, a game console, a set top box, a digital video recorder (DVR), etc. Media content that is delivered in two-dimensional or three-dimensional form according to embodiments described herein may be stored locally or received from remote locations. For instance, such media content may be locally stored for playback (replay TV, DVR), may be stored in removable memory (e.g. DVDs, memory sticks, etc.), may be received on wireless and/or wired pathways through a network such as a home network, through Internet download streaming, through a cable network, a satellite network, and/or a fiber network, etc. For instance, FIG. 36 shows a first media content 3630A that is stored in hard disk drive 3612, a second media content 3630B that is stored in storage medium 3624 of removable storage unit 3616, and a third media content 3630C that may be remotely stored and received over communication medium 3622 by communication interface 3618. Media content 3630 may be stored and/or received in these manners and/or in other ways.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A display system having a single viewing plane, the display system supporting a first viewer with first media content and a second viewer with second media content, the display system comprising:
   a plurality of display pixels that at least assist in simultaneously producing light corresponding to both the first media content and the second media content, at least one of the first media content or the second media content comprising three dimensional image data;
   a first light manipulator; and
   a second light manipulator;
   the first light manipulator and the second light manipulator together being configured to deliver the first media content to the first viewer via a first area of the single viewing plane but not to the second viewer, and to simultaneously deliver the second media content to the second viewer via a second area of the single viewing plane but not to the first viewer, and the first area and second area overlap each other at least in part.

2. The display system of claim 1, wherein the first light manipulator includes a plurality of barrier elements arranged in a barrier element array, each barrier element of the barrier element array having a blocking state and a non-blocking state, the barrier element array including a plurality of strips of barrier elements selected to be in the non-blocking state to form a plurality of non-blocking strips.

3. The display system of claim 2, wherein the second light manipulator includes a second plurality of barrier elements arranged in a second barrier element array, the second barrier element array including a second plurality of strips of barrier elements selected to be in the non-blocking state to form a second plurality of non-blocking strips.

4. The display system of claim 3, wherein the first plurality of non-blocking strips of the first barrier element array includes a plurality of non-blocking strip groups, the second parallax barrier includes a second plurality of non-blocking strips, and the second plurality of non-blocking strips includes a non-blocking strip corresponding to each of the plurality of non-blocking strip groups.

5. The display system of claim 2, wherein the second light manipulator is a lenticular lens that is positioned proximate to the barrier element array, the lenticular lens including an array of sub-lenses.

6. The display system of claim 1, wherein the first light manipulator is a first lenticular lens and the second light manipulator is a second lenticular lens.

7. The display system of claim 6, wherein at least one of the first lenticular lens or the second lenticular lens is elastic.

8. The display system of claim 1, wherein the first light manipulator is a lenticular lens and the second light manipulator includes an array of barrier elements.

9. The display system of claim 1, wherein the first and second light manipulators are positioned between the plurality of display pixels and a viewing space.

10. The display system of claim 1, wherein the plurality of display pixels is positioned between the first light manipulator and the second light manipulator.

11. The display system of claim 1, wherein the plurality of display pixels is positioned between the first and second light manipulators and a viewing space.

12. The display system of claim 1, further comprising:
    a backlighting panel, wherein the first light manipulator, second light manipulator, and the plurality of display pixels are positioned between the backlighting panel and a viewing space.

13. A method for supporting a first viewer with first media content and a second viewer with second media content in a single viewing plane, the method comprising:
    producing light corresponding to both the first media content and the second media content at least assisted by a plurality of display pixels, at least one of the first media content or the second media content comprising three dimensional image data; and
    simultaneously delivering the first media content to the first viewer and the second media content to the second viewer, the first media content being delivered to the first viewer via a first area of the single viewing plane but not to the second viewer, and the second media content being delivered to the second viewer via a second area of the single viewing plane but not to the first viewer, and the first area and second area overlap each other at least in part.

14. The method of claim 13, wherein the first light manipulator includes a plurality of barrier elements arranged in a barrier element array, each barrier element of the barrier element array having a blocking state and a non-blocking state, the barrier element array including a plurality of strips of barrier elements selected to be in the non-blocking state to form a plurality of non-blocking strips, wherein said simultaneously delivering the first media content to the first viewer and the second media content to the second viewer comprises:
  filtering the produced light with the barrier element array.

15. The method of claim 14, wherein the second light manipulator includes a second plurality of barrier elements arranged in a second barrier element array, the second barrier element array including a second plurality of strips of barrier elements selected to be in the non-blocking state to form a second plurality of non-blocking strips, wherein said simultaneously delivering the first media content to the first viewer and the second media content to the second viewer further comprises:
  filtering the filtered light with the second barrier element array.

16. The method of claim 15, wherein the first plurality of non-blocking strips of the first barrier element array includes a plurality of non-blocking strip groups, the second barrier element array includes a second plurality of non-blocking strips, and the second plurality of non-blocking strips includes a non-blocking strip corresponding to each of the plurality of non-blocking strip groups.

17. The method of claim 14, wherein the second light manipulator is a lenticular lens that is positioned proximate to the barrier element array, the lenticular lens including an array of sub-lenses, wherein said simultaneously delivering the first media content to the first viewer and the second media content to the second viewer further comprises:
  filtering the filtered light with the array of sub-lenses.

18. The method of claim 13, wherein the first light manipulator is a first lenticular lens and the second light manipulator is a second lenticular lens, wherein said simultaneously delivering the first media content to the first viewer and the second media content to the second viewer further comprises:
  filtering the produced light with the first lenticular lens; and
  filtering the filtered light with the second lenticular lens.

19. The method of claim 18, wherein at least one of the first lenticular lens or the second lenticular lens is elastic, the method further comprising:
  modifying an area of the elastic at least one of the first lenticular lens or the second lenticular lens.

20. The method of claim 13, wherein the first light manipulator is a lenticular lens and the second light manipulator includes an array of barrier elements, wherein said simultaneously delivering the first media content to the first viewer and the second media content to the second viewer further comprises:
  filtering the produced light with the lenticular lens; and
  filtering the filtered light with the array of barrier elements.

21. The method of claim 13, wherein the first and second light manipulators are positioned between the plurality of display pixels and a viewing space, wherein said producing light corresponding to both the first media content and the second media content at least assisted by a plurality of display pixels comprises:
  producing the light corresponding to both the first media content and the second media content with the plurality of display pixels.

22. The method of claim 13, wherein said producing light corresponding to both the first media content and the second media content at least assisted by a plurality of display pixels comprises:
  generating light with a backlighting panel; and
  filtering the generated light with the plurality of display pixels to produce the light corresponding to both the first media content and the second media content.

23. A display system having a single viewing plane, the display system supporting a first viewer with first media content and a second viewer with second media content, the display system comprising:
  a plurality of display pixels that at least assist in simultaneously producing light corresponding to both the first media content and the second media content;
  a light manipulator that controls delivery of the produced light to cause the first media content to be delivered to the first viewer via a first area of the single viewing plane but not to the second viewer, while simultaneously causing the second media content to be delivered to the second viewer via a second area of the single viewing plane but not to the first viewer, the light manipulator being configured to deliver at least one of the first media content or the second media content as a three-dimensional view; and
  the first area and second area overlap each other at least in part.

24. The display system of claim 23, wherein the light manipulator is configured to deliver the first media content to the first viewer as a two-dimensional view, and is configured to deliver the second media content to the second viewer as a three-dimensional view.

25. The display system of claim 23, wherein the light manipulator is configured to deliver the first media content to the first viewer as a first three-dimensional view, and is configured to deliver the second media content to the second viewer as a second three-dimensional view.

26. The display system of claim 25, wherein the plurality of display pixels include a first set of pixels and a second set of pixels that are interleaved with each other.

* * * * *